(12) United States Patent
Nakamura

(10) Patent No.: US 11,928,375 B2
(45) Date of Patent: Mar. 12, 2024

(54) IMAGE PROCESSING APPARATUS AND OPERATION STATUS NOTIFICATION METHOD FOR IMAGE PROCESSING APPARATUS

(71) Applicant: SHARP KABUSHIKI KAISHA, Sakai (JP)

(72) Inventor: Hiroaki Nakamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/745,625

(22) Filed: May 16, 2022

(65) Prior Publication Data

US 2022/0382491 A1 Dec. 1, 2022

(30) Foreign Application Priority Data

May 27, 2021 (JP) ................................. 2021-089325

(51) Int. Cl.
*G06F 3/12* (2006.01)
(52) U.S. Cl.
CPC ............ *G06F 3/126* (2013.01); *G06F 3/1207* (2013.01); *G06F 3/1259* (2013.01)
(58) Field of Classification Search
CPC ...... G06F 3/126; G06F 3/1207; G06F 3/1259; G06F 3/1285; Y02D 10/00
See application file for complete search history.

(56) References Cited

U.S. PATENT DOCUMENTS

| 2007/0229882 A1* | 10/2007 | Kondo ................... G06F 3/1259 358/1.15 |
| 2014/0111826 A1* | 4/2014 | Nakamura ......... G06K 15/1823 358/1.14 |
| 2016/0210091 A1* | 7/2016 | Martin ................... G06F 3/1217 |
| 2018/0321986 A1* | 11/2018 | Venkataraman ...... G06F 9/5011 |
| 2022/0171579 A1* | 6/2022 | Ushinohama ......... G06F 3/1268 |

FOREIGN PATENT DOCUMENTS

JP H10-143450 A 5/1998

* cited by examiner

*Primary Examiner* — Iriana Cruz
(74) *Attorney, Agent, or Firm* — ScienBiziP, P.C.

(57) ABSTRACT

An image processing apparatus includes: a job acquirer that acquires a job; a function executor that executes a function requested for the acquired job; and a completion notification selector that selects a timing for transmitting, to an information processing apparatus, a process completion notification indicating normal termination of execution of the function after the function is executed. The timing for transmitting the process completion notification to the information processing apparatus includes a job execution completion time that is a time when the execution of the function normally terminates and a job acquisition completion time that is a time before the execution of the function starts. In a status where there is a function currently being executed and no new job is acquirable, the completion notification selector selects the job acquisition completion time as the timing for transmitting the process completion notification to the information processing apparatus.

10 Claims, 21 Drawing Sheets

FIG. 3

| | STATUS | OPERATION STATUS |
|---|---|---|
| 1 | ST1 | ACCEPTING PROCESS |
| 2 | ST2 | EXECUTING FAX TRANSMISSION |
| 3 | ST3 | NORMAL TERMINATION |
| 4 | ST4 | ERROR TERMINATION |
| 5 | ST5 | EXECUTING PRINTING |

OPERATION STATUS SETTING INFORMATION 42

FIG. 4

COMPLETION NOTIFICATION SWITCHING CONDITION 43

| | CONDITION ITEM | | SWITCH TO TYPE A | SWITCH TO TYPE B |
|---|---|---|---|---|
| 1 | PORT | AVAILABLE | ○ | — |
| | | UNAVAILABLE | — | ○ |
| 2 | STORAGE RESOURCE | AVAILABLE | ○ | — |
| | | UNAVAILABLE | — | — |
| 3 | FUNCTION IN EXECUTION | PRESENT | — | ○ |
| | | ABSENT | ○ | — |

| COMPLETION NOTIFICATION TYPE | TYPE A | TRANSMIT PROCESS COMPLETION NOTIFICATION AT FUNCTION EXECUTION COMPLETION (NORMAL TERMINATION) TIME |
|---|---|---|
| | TYPE B | TRANSMIT PROCESS COMPLETION NOTIFICATION AT JOB ACQUISITION COMPLETION TIME |

FIG. 5

CURRENT COMPLETION NOTIFICATION INFORMATION 44

| | PROCESS COMPLETION NOTIFICATION TRANSMISSION TIMING |
|---|---|
| A | JOB EXECUTION COMPLETION TIME |
| B | JOB ACQUISITION COMPLETION TIME |

FIG. 6

JOB MANAGEMENT INFORMATION 45

| 1 | JOB ID | JOB01 | JOB02 | JOB03 |
|---|---|---|---|---|
| 2 | JOB TYPE | FAX | FAX | PRINTING |
| 3 | JOB FILE NAME | FL01 | FL02 | FL03 |
| 4 | CURRENT OPERATION STATUS (STATUS) | ST3 | ST2 | ST5 |
| 5 | ACCEPTANCE TIME | 10:00 | 10:05 | 10:10 |

FIG. 10

| JOB ID | | J01 | J02 | J03 | J04 |
|---|---|---|---|---|---|
| JOB STATUS | | FORMATION | RECEPTION | ACCEPTANCE | UNACCEPTABLE |
| USED PORT | PT1 | O | — | — | — |
| | PT2 | — | O | — | — |
| | PT3 | — | — | O | — |
| PROCESS PROGRESS STATUS | M1 JOB ACCEPTANCE | (TERMINATED) | (TERMINATED) | O | — |
| | M2 JOB RECEPTION | (TERMINATED) | O | — | — |
| | M3 IMAGE FORMATION | O | — | — | — |
| | M4 COMPLETION NOTIFICATION | — | — | — | — |
| | M5 FUNCTION EXECUTION | — | — | — | — |

COMPLETION NOTIFICATION TYPE: TYPE B

↑ PT1 OCCUPIED   ↑ PT2 OCCUPIED   ↑ PT3 OCCUPIED   ↑ NO USED PORT

FIG. 11

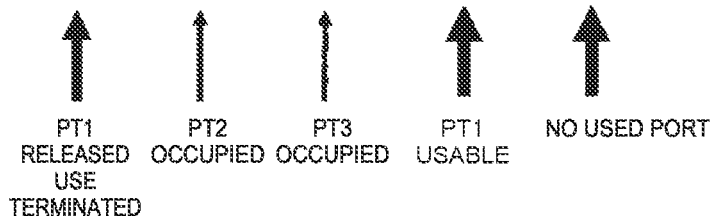

| JOB ID | | J01 | J02 | J03 | J04 | J05 |
|---|---|---|---|---|---|---|
| JOB STATUS | | ACQUIRED | FORMATION | RECEPTION | ACCEPTABLE | UNACCEPTABLE |
| USED PORT | PT1 | — | — | — | ○ | — |
| | PT2 | — | ○ | — | — | — |
| | PT3 | — | — | ○ | — | — |
| PROCESS PROGRESS STATUS | M1 JOB ACCEPTANCE | (TERMINATED) | (TERMINATED) | (TERMINATED) | — | — |
| | M2 JOB RECEPTION | (TERMINATED) | (TERMINATED) | ○ | — | — |
| | M3 IMAGE FORMATION | (TERMINATED) | ○ | — | — | — |
| | M4 COMPLETION NOTIFICATION | ○ | — | — | — | — |
| | M5 FUNCTION EXECUTION | — | — | — | — | — |

↑ PT1 RELEASED USE TERMINATED    ↑ PT2 OCCUPIED    ↑ PT3 OCCUPIED    ↑ PT1 USABLE    ↑ NO USED PORT

FIG. 12

COMPLETION NOTIFICATION TYPE: TYPE B

| JOB ID | | | J01 | J02 | J03 | J04 | J05 |
|---|---|---|---|---|---|---|---|
| JOB STATUS | | | ACQUIRED | ACQUIRED | FORMATION | ACCEPTABLE | ACCEPTABLE |
| USED PORT | | PT1 | — | — | — | ○ | — |
| | | PT2 | — | — | — | — | ○ |
| | | PT3 | — | — | ○ | — | — |
| PROCESS PROGRESS STATUS | M1 | JOB ACCEPTANCE | (TERMINATED) | (TERMINATED) | (TERMINATED) | ○ | ○ |
| | M2 | JOB RECEPTION | (TERMINATED) | (TERMINATED) | (TERMINATED) | — | — |
| | M3 | IMAGE FORMATION | (TERMINATED) | (TERMINATED) | ○ | — | — |
| | M4 | COMPLETION NOTIFICATION | (TERMINATED) | ○ | — | — | — |
| | M5 | FUNCTION EXECUTION | ○ | — | — | — | — |

↑ PT1 RELEASED USE TERMINATED
↑ PT2 RELEASED USE TERMINATED
↑ PT3 OCCUPIED
↑ PT1 OCCUPIED
↑ PT2 OCCUPIED

IMAGE PROCESSING APPARATUS AND OPERATION STATUS NOTIFICATION METHOD FOR IMAGE PROCESSING APPARATUS

CROSS-REFERENCE TO RELATED APPLICATION

The present application claims priority from Japanese Patent Application Number 2021-089325, the content to which is hereby incorporated by reference into this application.

BACKGROUND OF THE INVENTION

1. Field of the Invention

One aspect of the present disclosure relates to an image processing apparatus, and the like, and in particular to an image processing apparatus, and the like, that may receive a plurality of jobs from an information processing apparatus connected to the image processing apparatus via a network and executes a requested function such as printing for each of the jobs.

2. Description of the Related Art

There is a used printing system in which an information processing apparatus, such as a mobile terminal, owned by a user is connected to an image processing apparatus via a network and, after image data transmitted from the information processing apparatus is stored in the image processing apparatus, the image data may be printed on a predetermined print sheet.

By using a standard, e.g., Internet Printing Protocol (IPP), a job including image data is transmitted and received between an information processing apparatus and an image processing apparatus connected via the Internet, and when the information processing apparatus transmits a process request for a job to the image processing apparatus, the image processing apparatus executes a function such as printing and fax transmission for the received job.

In a case where the information processing apparatus transmits a print request for a job to the image processing apparatus, after the image processing apparatus actually executes printing for the job, the image processing apparatus transmits a print completion notification indicating printing completion to the information processing apparatus to notify the user who owns the information processing apparatus that printing is complete.

Japanese Unexamined Patent Application Publication No. 10-143450 discloses a job processing apparatus in which job processing methods include two methods for acceptance-completed serial processing in which processes for documents are not executed until all the documents included in the job are accepted and for non acceptance-completed serial processing in which processes for documents are executed in the order they are accepted, and after a job request including a job processing mode indicating either the acceptance-completed serial processing or non acceptance-completed serial processing is accepted from a client, it is determined whether the accepted job has either one of the job processing modes, and when it is an acceptance-completed serial processing mode, the jobs are executed by batch when the final document included in the job is accepted, and when it is non acceptance-completed serial processing, the process is sequentially executed for each document, and thus batch processing and sequential processing are switched for jobs, which improves the processing efficiency.

SUMMARY OF THE INVENTION

In the image processing apparatus described above, in a case where only one job is acceptable at a time, after a process such as printing is executed for one accepted job, the image processing apparatus transmits a completion notification indicating normal completion of the process to the information processing apparatus, and the information processing apparatus receives the completion notification and then transmits the process request for the subsequent job to the image processing apparatus.

In this case, when the image processing apparatus takes a long time to process the job and transmits the completion notification in a delayed timing, the information processing apparatus is not able to transmit the process request for the subsequent job, which causes the user of the information processing apparatus to wait.

In particular, when the process of the job requested to the image processing apparatus is fax transmission, it often takes a long waiting time for the subsequent job because it takes time to complete fax transmission of the image data. Furthermore, in the case of fax transmission, it may result in waiting for redial because of the difficulty in connecting to the destination, and therefore it may take a long time to complete the job of fax transmission, which increases the time and the number of times the subsequent job has to wait.

Some image processing apparatuses include a plurality of ports that accept jobs so as to simultaneously accept a plurality of jobs and simultaneously execute the processes of the respective jobs, but the jobs more than the number of ports are not acceptable, and the process request for the subsequent job is not acceptable until the process for one job, which is being processed, is normally complete and the completion notification of the job is transmitted to the information processing apparatus.

Furthermore, even though a plurality of ports is provided to accept jobs, it may be difficult to simultaneously process a plurality of jobs because of insufficient system resources of the image processing apparatus, and eventually the process request for the subsequent job may be unacceptable until one job is complete and the completion notification of the job is transmitted to the information processing apparatus.

For example, even though a plurality of jobs may be simultaneously accepted and the image data on the jobs may be stored in an internal memory, a waiting status occurs for the process of other jobs when it is difficult to perform an image formation process itself for printing in parallel, and eventually the process request for the subsequent job may be unacceptable until the process for the job, which is being processed, is normally complete and the completion notification of the job is transmitted to the information processing apparatus.

Thus, one aspect of the present disclosure has been made in consideration of the above circumstances and has an object to provide an image processing apparatus, and the like, that may efficiently execute a function requested for a plurality of jobs to be processed.

One aspect of the present disclosure is to provide an image processing apparatus including a job acquirer that acquires a job transmitted from an information processing apparatus, a function executor that executes a function requested for the acquired job, and a completion notification selector that selects a timing for transmitting, to the information processing apparatus, a process completion notification indicating normal termination of execution of the function after the function is executed, wherein the timing for transmitting the process completion notification to the information processing apparatus includes a job execution completion time that is a time when the execution of the function normally terminates and a job acquisition completion time that is a time before the execution of the function starts, and in a status where there is a function currently being executed and no new job is acquirable, the completion notification selector selects the job acquisition completion time as the timing for transmitting the process completion notification to the information processing apparatus.

Furthermore, one aspect of the present disclosure is to provide an operation status notification method for an image processing apparatus including acquiring a job transmitted from an information processing apparatus, executing a function requested for the acquired job, selecting a timing for transmitting, to the information processing apparatus, a process completion notification indicating normal termination of execution of the function after the function is executed, and transmitting the process completion notification to the information processing apparatus, wherein the timing for transmitting the process completion notification to the information processing apparatus includes a job execution completion time that is a time when the execution of the function normally terminates and a job acquisition completion time that is a time before the execution of the function starts, when the image processing apparatus is in a status where there is a function currently being executed and no new job is acquirable, the selecting selects the job acquisition completion time as the timing for transmitting the process completion notification to the information processing apparatus, after acquiring the job at the acquiring, the transmitting is executed at the job acquisition completion time before execution of the function requested for the acquired job starts, and the executing is executed after the process completion notification for the acquired job is transmitted to the information processing apparatus.

According to one aspect of the present disclosure, it is possible to provide an image processing apparatus, and the like, that may efficiently execute the function requested for a plurality of jobs to be processed.

BRIEF DESCRIPTION OF THE DRAWINGS

FIG. 3 is an explanatory diagram of information (operation status setting information) stored in a storage of the image processing apparatus according to an embodiment of the present disclosure.

FIG. 4 is an explanatory diagram of information (completion notification switching condition) stored in the storage of the image processing apparatus according to an embodiment of the present disclosure.

FIG. 5 is an explanatory diagram of information (current completion notification information) stored in the storage of the image processing apparatus according to an embodiment of the present disclosure.

FIG. 6 is an explanatory diagram of information (job management information) stored in the storage of the image processing apparatus according to an embodiment of the present disclosure.

FIG. 10 is an explanatory diagram illustrating process progress statuses of a plurality of jobs when the current completion notification information is Type B in the image processing apparatus according to an embodiment of the present disclosure.

FIG. 11 is an explanatory diagram illustrating the process progress statuses of the jobs when the current completion notification information is Type B in the image processing apparatus according to an embodiment of the present disclosure.

FIG. 12 is an explanatory diagram illustrating the process progress statuses of the jobs when the current completion notification information is Type B in the image processing apparatus according to an embodiment of the present disclosure.

DETAILED DESCRIPTION OF THE INVENTION

Figure 1:
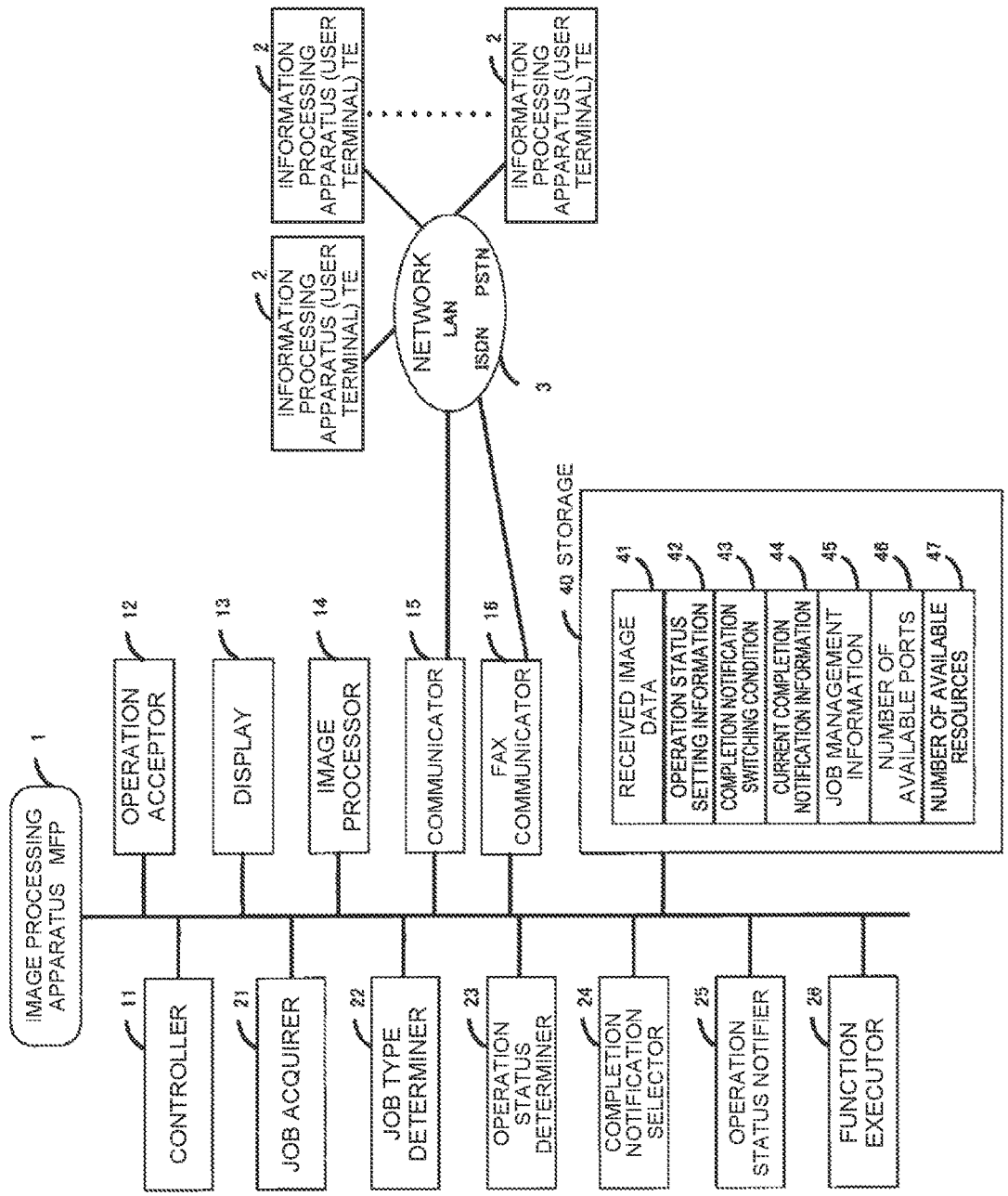
FIG. 1 is a configuration block diagram of an image processing apparatus according to an embodiment of the present disclosure.

The job acquisition completion time is a status where the function requested for the job to be processed is executable and, in a status where the job acquisition completion time is selected as the timing for transmitting the process completion notification to the information processing apparatus, after the process completion notification for the job acquired by the job acquirer is transmitted to the information processing apparatus, the function executor starts to execute the function requested for the acquired job.

One or more ports that accept a job transmitted from the information processing apparatus are included, wherein the status where no new job is acquirable is a status where there is no port capable of accepting a job.

In a status where there is no function currently being executed and a new job is acquirable, the completion notification selector selects the job execution completion time as the timing for transmitting the process completion notification to the information processing apparatus.

In a status where the job execution completion time is selected as the timing for transmitting the process completion notification to the information processing apparatus, after the function requested for the acquired job is executed by the function executor and the function normally terminates, the process completion notification is transmitted to the information processing apparatus.

One or more ports that accept a job transmitted from the information processing apparatus are included, and one or more storage resources that are storage areas used to execute the function required for the acquired job are included, wherein the status where the new job is acquirable is a status where there are one or more ports capable of accepting a job and there are one or more usable storage resources.

The job acquirer is capable of acquiring at least one new job in a status after the process completion notification for the acquired job is transmitted to the information processing apparatus.

When the timing for transmitting the process completion notification to the information processing apparatus is changed from the job execution completion time to the job acquisition completion time and when the timing for transmitting the process completion notification to the information processing apparatus is changed from the job acquisition completion time to the job execution completion time, the change in the timing for transmitting the process completion notification to the information processing apparatus is transmitted to the connectable information processing apparatus.

A storage that stores current completion notification information indicating the timing for transmitting the process completion notification to the information processing apparatus is further included, Type A is stored in the current completion notification information when the completion notification selector selects the job execution completion time as the timing for transmitting the process completion notification to the information processing apparatus, Type B is stored in the current completion notification information when the completion notification selector selects the job acquisition completion time as the timing for transmitting the process completion notification to the information processing apparatus, and when the current completion notification information is changed from Type A to Type B and changed from Type B to Type A, the change in the timing for transmitting the process completion notification to the information processing apparatus is transmitted to the connectable information processing apparatus.

Embodiments of the present disclosure will be described below with reference to the drawings. The present disclosure is not limited to the descriptions of the embodiments below.

According to one aspect of the present disclosure, an image processing system includes an image processing apparatus connected via a network and an information processing apparatus that stores image data processed by the image processing apparatus.

The information processing apparatus corresponds to a personal computer or portable terminal owned by a user who intends a process such as printing with the image processing apparatus, and one or more information processing apparatuses are connectable to the image processing apparatus via a network.

Hereinafter, the information processing apparatus is also referred to as user terminal (TE).

The image processing apparatus (hereinafter also referred to as multifunction peripheral (MFP)) is an apparatus that processes image data and is for example an electronic device having a duplicate (copy) function, printing function, document read (scan) function, document edit function, document storage function, document transmission (fax) function, communication function, etc.

The image processing apparatus has the function to temporarily store image data (referred to as received job or also simply referred to as job) transmitted from a user terminal and, in principle, process the received jobs in the order they are accepted.

The image processing apparatus MFP includes one or more ports that accept jobs and are capable of simultaneously accepting process requests for the number of jobs corresponding to the number of ports.

For example, when three ports are included, the process requests for three jobs may be simultaneously accepted, and the image data included in each job may be temporarily stored.

According to one aspect of the present disclosure, in principle, in a case where there is a plurality of usable ports (available ports), after the process for one job is complete, a process completion notification (also referred to as job normal termination notification) indicating that the process for the job is complete is transmitted to the information processing apparatus that requested the process for the job, as in the conventional manner.

Conversely, when there is no usable port (available port) and there is a job being currently processed, a process completion notification (job normal termination notification) indicating that the process of the job being executed is complete is transmitted to the information processing apparatus that requested the process for the job even though the process for the job being executed is not complete.

In particular, as described below, one aspect of the present disclosure is characterized in that, when current completion notification information is set to Type B and a job process request is received from the information processing apparatus, a process completion notification (job normal termination notification) indicating that the process for the job being executed is complete is transmitted to the information processing apparatus that requested the process for the job after the process regarding the acceptance of the job is performed even though the actual process for the job is not complete.

Configuration of Image Processing Apparatus FIG. 1 is a configuration block diagram of an image processing apparatus according to an embodiment of the present disclosure.

An image processing apparatus (MFP) 1 is a multifunctional peripheral that has multiple functions as described above and, according to the embodiment below, has at least a printing function, a fax transmission function, and a communication function.

As illustrated in FIG. 1, the image processing apparatus (MFP) 1 may connect to a plurality of information processing apparatuses (TE) 2 for data communication via a network 3 such as LAN (wired and wireless).

The information processing apparatus (TE) 2 corresponds to a user terminal that inputs image data, etc. to be processed by the image processing apparatus, and the plurality of information processing apparatuses 2 is connected to the network 3.

The information processing apparatus generates or input document data and image data, generates a job including the image data, etc., for a process by the image processing apparatus, and transmits a job process request to request a process for the job to the image processing apparatus.

The job process request includes, for example, the type of job such as printing or fax, and the job process request is information that requests a printing process, fax transmission process, etc., of the image data included in the job.

In FIG. 1, the image processing apparatus (MFP) 1 primarily includes a controller 11, an operation acceptor 12, a display 13, an image processor 14, a communicator 15, a fax communicator 16, a job acquirer 21, a job type determiner 22, an operation status determiner 23, a completion notification selector 24, an operation status notifier 25, a function executor 26, and a storage 40.

The controller 11 is a part that controls an operation of each component, such as the operation acceptor and the image processor, and is primarily implemented by a microcomputer including a CPU, a ROM, a RAM, an I/O controller, a timer, etc.

The CPU organically operates various types of hardware based on a control program previously stored in the ROM, or the like, to perform an image processing function, and the like, according to one aspect of the present disclosure.

The operation acceptor 12 is a part through which the user of the image processing apparatus inputs information and is an input device for performing predetermined input operations to operate the image processing apparatus. For example, it is a part that inputs information such as characters and selects and inputs functions and uses a keyboard, a mouse, a touch panel, etc.

Examples of the keys operated by the user include an operation start key, a function selection key, and a setting key.

For example, the user performs an input operation on a touch panel or a start key for a reading operation and thus executes a print item setting function, document reading function, printing function, fax transmission function, etc.

The display 13 is a part that displays information and displays the information needed to execute each function, a result of execution of a function, and the like, in order to notify it to the user. For example, an LCD, an organic EL display, or the like, is used, and when a touch panel is used as the operation acceptor 12, the display 13 and the touch panel are arranged in a superimposed manner.

The display 13 uses characters, symbols, figures, images, icons, animations, moving images, and the like, to display for example the information necessary to set the setting items used for printing, and the like, of the image processing apparatus and to execute the printing function, and the like, the operation screen of the selected function, and the print item setting operation screen.

The image processor 14 is a part that performs the image forming function, which is a primary function of the image processing apparatus, and primarily includes an image inputter, an image former, and an image outputter.

Primarily, the image inputter is a part that inputs predetermined image data, and the image former is a part that converts the input image data into information that may be printed, or the like, and the image outputter is a part that outputs formed print information, or the like, onto a print sheet, etc.

The image inputter is a part that inputs the image data on a document describing an image, character, graphic, and the like, and is for example a part that reads a document loaded on a document table, etc.

A scanner (reading device) that reads a document describing information is used as the image inputter.

The image processing apparatus includes a document loading table (document table) on which the document is loaded and a document cover that presses the document in order to read the document.

The image processing apparatus may also include an automatic document feeder (ADF) that loads a plurality of documents and automatically transports the document one by one to read them.

In this case, the document describing the image, and the like, is read by the scanner, and the image data of the document is stored in the storage 40.

There are various methods for inputting image information.

For example, it is possible to input the image information that is transmitted from the information processing apparatus TE such as a personal computer or a mobile terminal owned by the user or a server via the network 3.

An interface connecting an external storage medium such as a USB memory corresponds to the image inputter.

An electronic data file for the image information to be input may be stored in an external storage medium such as a USB memory, the USB memory, or the like, may be connected to an input interface such as a USB terminal, the desired electronic data file stored in the USB memory, or the like, may be read by a predetermined input operation with the operation acceptor 12, and may be stored as input image data in the storage 40.

For example, to print the input image data on a recording medium, the image former typically performs processes for charging, exposure, development, transfer, cleaning, static elimination, and fixing in a continuous manner to form the input image data on the recording medium.

During the developing process, toner is supplied from a toner cartridge to a developing device and an electrostatic latent image formed on the surface of a charged photoreceptor drum is developed to form a toner image corresponding to the electrostatic latent image. The toner image formed on the surface of the photoreceptor drum is transferred onto the recording medium by a transfer device and then the image is fixed to the recording medium due to the heat applied by a fixing device.

The image former also converts the input image data into information in a form that enables fax transmission or display.

The image outputter is a part that outputs the formed input image data and corresponds to, for example, a printer that prints information such as the input image data to print the input image data of the read document on a predetermined print sheet (sheet medium).

The output of the input image data is not limited to printing, but also includes storage of the input image data of the scanned document, fax transmission of the input image data included in the job transmitted from the information processing apparatus, etc.

For example, the image output corresponds to storage of the input image data on the read document in an external storage medium such as USB memory, fax transmission of the input image data to a fax receiver via a network such as the Internet, and transmission of the input image data to other information processing apparatuses or servers.

The communicator 15 is a part that communicates information via the network 3 and is a part that communicates data with a portable terminal (user terminal) owned by the user and other information processing apparatuses.

For example, an electronic data file transferred from the information processing apparatus TE such as user terminal or server is received.

The input image data, which is input to the image processing apparatus MFP, is transferred to an external storage device (e.g., USB memory) connected to the image processing apparatus MFP and is transmitted to the information processing apparatus TE such as user terminal or server via the network 3.

Any communication network, e.g., a wide area communication network such as the Internet, IP network, LAN, or NGN, may be used as the network 3, and both wired communication and wireless communication may be used as a communication format.

The fax communicator 16 is a part that communicates information by a facsimile via the network 3 such as IP network using a public telephone network PSTN, ISDN, or optical network.

The job acquirer 21 is a part that acquires a job transmitted from the information processing apparatus TE.

For example, when the image data to be printed is input and a print request operation is performed in the information processing apparatus TE, a job process request for requesting printing of the image data is transmitted to the image processing apparatus MFP, and therefore the job process request is acquired.

The job process request primarily includes the user name of the user who input the image data, the identification information (IP address) of the information processing apparatus TE, the information (job type) indicating the type of process for a job, the name of the job (job ID or job name), etc.

When the job process request is acquired, it is determined whether the job indicated by the job process request may be currently accepted.

When the job indicated by the job process request is acceptable, an acceptance permission notification is transmitted to the information processing apparatus TE, and then the job information transmitted from the information processing apparatus TE is acquired. The job information includes the image data to be processed itself.

When the job information is acquired, the function requested for the image data to be processed is executed.

The image processing apparatus MFP includes one or more ports that accept a job transmitted from the information processing apparatus TE and is capable of simultaneously acquiring the number of jobs corresponding to the number of ports.

The port refers to a gate for input/output to communicate data via the network.

For example, when three ports are included, in the status where two jobs have already been acquired and are currently processed, two ports are occupied, but there is one available port, and therefore one more job may be acquired.

However, in the status where three jobs have already been acquired and are currently processed, there is no available port, and therefore no more new job may be acquired.

The job type determiner 22 is a part that determines the type of job acquired. Specifically, the job type included in the job process request is used to determine the type of process to be executed for the acquired job. For example, when the job type is "printing", a printing process is executed for the job included in the job process request. Alternatively, when the job type is "fax transmission", a fax transmission process is executed for the job included in the job process request.

The operation status determiner 23 is a part that determines the current operation status regarding the acquired job.

For example, based on the process progress status of the acquired job, it is determined whether the current status is the status of having accepted the process request, the status of executing the requested process, the status of having normally terminated the process, the status of having failed to normally terminate the process, the stand-by status for retransmission because of the failure to normally terminate, etc.

The current operation status is determined by using, for example, operation status setting information illustrated in FIG. 3 below, and it is determined which status the current operation status of the job belongs to.

The completion notification selector 24 is a part that selects the timing (time) for transmitting a completion notification of the job and primarily selects the timing (time) for transmitting, to the information processing apparatus TE, the process completion notification indicating normal termination of execution of the function after the function requested for the acquired job is executed.

The timing (time) for transmitting the process completion notification to the information processing apparatus TE includes a job execution completion time that is a time when the execution of the function normally terminates and a job acquisition completion time that is a time before the execution of the function starts.

For example, in the status where there is a function currently being executed and no new job is acquirable, the completion notification selector 24 selects the job acquisition completion time as the timing for transmitting the process completion notification to the information processing apparatus TE.

Conversely, in the status where there is no function currently being executed and a new job is acquirable, the completion notification selector 24 selects the job execution completion time as the timing for transmitting the process completion notification to the information processing apparatus TE.

For selecting the timing (time) for transmitting the process completion notification, current completion notification information 44 indicating the timing for transmitting the completion notification of the job is set and stored based on a completion notification switching condition, as described below.

For example, when the completion notification selector 24 selects the job execution completion time as the timing for transmitting the process completion notification to the information processing apparatus, Type A is stored in the current completion notification information 44.

When the completion notification selector 24 selects the job acquisition completion time as the timing for transmitting the process completion notification to the information processing apparatus, Type B is stored in the current completion notification information 44.

As illustrated in FIG. 4 below, there are Type A and Type B as the completion notification types indicating the timing of the completion notification of the job, and the conditions for switching the completion notification type are previously set as the completion notification switching conditions.

Either Type A or Type B is selected as the timing for transmitting the process completion notification based on the currently satisfied status of condition items illustrated in the completion notification switching conditions in FIG. 4.

A specific example of switching of the completion notification type will be described below.

The operation status notifier 25 is a part that transmits the current operation status (status) of the image processing apparatus MFP to the information processing apparatus TE for each acquired job.

For example, when an acquired job JOB01 is in the status of accepting the process, the current operation status (status: ST1) indicating that it is accepting the process is transmitted to the information processing apparatus TE, as described below.

Alternatively, when the acquired job JOB01 is in the status of having normally terminated the process to be executed for the job, the current operation status (status: ST3) indicating normal termination is transmitted to the information processing apparatus TE, as described below.

However, in a case where the setting content (the current completion notification information) of the current completion notification type is "Type B", even though the process to be executed for the job has not normally terminated, the current operation status (status: ST3) indicating normal termination is transmitted to the information processing apparatus TE after the acquisition of the job is normally complete.

The current completion notification information 44, which indicates the timing for transmitting the process completion notification, is changed to Type A or Type B based on the completion notification switching conditions, and when the current completion notification information 44 is changed from Type A to Type B and from Type B to Type A, the change in the timing for transmitting the process completion notification to the information processing apparatus may be transmitted to the connectable information processing apparatus TE.

For example, as described below, when the current completion notification information 44 is changed from Type A to Type B, the image processing apparatus MFP may transmit, to the information processing apparatus TE, the fact that the setting is currently made such that the process completion notification is transmitted to the information processing apparatus TE at the job acquisition completion time.

When the current completion notification information 44 is changed from Type B to Type A, the image processing apparatus MFP may transmit, to the information processing apparatus TE, the fact that the setting is currently made such that the process completion notification is transmitted to the information processing apparatus TE at the job execution completion time.

The function executor 26 is a part that executes a predetermined function provided by the image processing apparatus MFP.

For example, the function requested for the acquired job is executed.

When the job for the purpose of printing is transmitted from the information processing apparatus, the printing function is executed for the acquired job.

When the user who has come to use the image processing apparatus performs a predetermined operation to execute the printing function, the printing function is executed.

According to one aspect of the present disclosure, a completion notification function of the job is provided, and the process completion notification of the job (job normal termination notification) is transmitted to the information processing apparatus TE in a predetermined timing based on the current setting content (the current completion notification information) of the completion notification type.

For example, as described below, in a case where the current setting content (the current completion notification information) of the completion notification type is "Type A", that is, in the status where the job execution completion time is selected as the timing for transmitting the process completion notification to the information processing apparatus, after the function requested for the job acquired by the function executor 26 is executed and the function normally terminates, the process completion notification (job normal termination notification) for the job, for which the function normally terminated, is transmitted to the information processing apparatus TE.

Conversely, in a case where the current setting content (the current completion notification information) of the completion notification type is "Type B", that is, in the status where the job acquisition completion time is selected as the timing for transmitting the process completion notification to the information processing apparatus, after the acquisition of the job is normally complete and the process completion notification (the job normal termination notification) for the job acquired by the job acquirer 21 is transmitted to the information processing apparatus TE, the function executor 26 starts to execute the function requested for the acquired job.

After the process completion notification (the job normal termination notification) for the acquired job is transmitted to the information processing apparatus, it means that the execution of the function requested for the acquired job is complete, and therefore the port having accepted the acquired job is released and the job acquirer 21 may acquire at least one new job in this status.

The storage 40 is a part that stores information and programs necessary for executing each function of the image processing apparatus MFP according to one aspect of the present disclosure and uses a semiconductor storage device such as a ROM, a RAM, or a flash memory, a storage device such as an HDD or an SSD, and other storage media.

The storage 40 stores, for example, received image data 41, operation status setting information 42, a completion notification switching condition 43, the current completion notification information 44, job management information 45, a number of available ports 46, a number of available resources 47, etc.

The received image data 41 is image data included in the job information transmitted from the information processing apparatus TE and is target data for process such as printing and fax transmission.

The operation status setting information 42 is information in which the type of operation status of the image processing apparatus MFP is previously set and stored.

In the operation status setting information 42, primarily, the type of operation status regarding the progress status of the process of the job is set.

FIG. 3 is an explanatory diagram of information (the operation status setting information) stored in the storage of the image processing apparatus MFP according to an embodiment.

FIG. 3 illustrates five operation statuses (also referred to as statuses) regarding the progress status of the process of the job.

In FIG. 3, the status ST1 refers to "accepting the process" and refers to the status of having accepted the process of the requested job from the information processing apparatus TE and the operation status of executing the process regarding the acceptance by the image processing apparatus MFP.

For example, after the job process request is received from the information processing apparatus TE, it is determined whether the job is acceptable, and when the job is acceptable, the operation status of the image processing apparatus MFP is set to the status ST1 (accepting the process).

After the status ST1 (accepting the process) is set, an acceptance permission notification is returned to the information processing apparatus TE.

When the job information including the image data is received from the information processing apparatus TE, the image formation process is executed for the image data included in the job information in order to execute a predetermined function for the image data, and the operation status in the status ST1 (accepting the process) continues until the execution of the image formation process is complete.

When the execution of the image formation process is complete, the status is obtained so as to execute the function requested for the job to be processed.

According to the embodiment below, the status ST1 (accepting the process) is an operation status after the job becomes acceptable by an acceptance/rejection determination process of the job until the transmission of the acceptance permission notification, the reception of the job information, and the execution of the image formation processing are complete.

The time when the execution of the image formation process is complete is referred to as a job acquisition completion time.

The job acquisition completion time is the status where the function requested for the job to be processed is executable and is the status before the execution of the function starts.

A status ST2 refers to "executing fax transmission" and, as the type of job requested by the information processing apparatus TE is "fax transmission", refers to the status of currently executing the function of fax transmission for the job and the operation status where the fax transmission is not yet complete. Furthermore, "executing fax transmission" also includes the standby status for retransmission because of the failure of normal transmission.

The status ST3 refers to "normal termination" and refers to the operation status where, after the function for the job requested by the information processing apparatus TE was executed, the function normally terminated.

For example, the operation status in the status ST3 is set when the fax transmission function is normally complete.

The time when the execution of the image formation process normally terminates is referred to as a job execution completion time.

The job execution completion time is a status after the function requested for the job to be processed is actually executed and the execution of the function normally terminates.

A status ST4 refers to "error termination" and refers to the status where, after the function for the job requested by the information processing apparatus TE was executed, the function failed to normally terminate.

For example, when the fax transmission function failed to normally terminate even after a predetermined number of times of retransmission although the fax transmission function was executed, the operation status is set in the status ST4.

A status ST5 refers to "executing printing" and, as the type of job requested by the information processing apparatus TE is "printing", refers to the status of currently executing the printing function for the job and the operation status where the printing function is not yet complete.

The operation statuses (statuses) are not limited to five in FIG. 3, and other operation statuses may be added or the operation statuses may be deleted.

The operation status setting information 42 may be set and stored in a fixed manner or may be changed by the user.

The completion notification switching condition 43 is information that previously sets and stores the condition for switching the current completion notification information 44 to determine the timing for transmitting the process completion notification of the job to the information processing apparatus TE.

FIG. 4 is an explanatory diagram of the information (the completion notification switching condition) stored in the storage of the image processing apparatus according to an embodiment.

The current completion notification information 44 includes two completion notification types, Type A and Type B, as illustrated in FIG. 4.

Type A has the setting to transmit the process completion notification to the information processing apparatus TE when the execution of the requested function is complete (normal termination).

Type B has the setting to transmit the process completion notification to the information processing apparatus TE at the job acquisition completion time although the execution of the requested function is not actually complete.

The completion notification switching condition 43 in FIG. 4 illustrates three condition items as conditions.

The three condition items are the availability (available or unavailable) of ports, the availability (available or unavailable) of storage resources, and the presence or absence (function present or function absent) of the function being executed.

As described above, the port refers to a gate for input/output to communicate data via a network and corresponds to, for example, a virtual terminal that accepts jobs, and the number of ports included in the image processing apparatus MFP may be one or more.

In a case where there is a plurality of ports, for example, when the ports includes one or more available ports that may accept a job, "available" is determined.

"Available" may be determined when there are two or more available ports in consideration of the margin of port acceptance.

Conversely, when there are no available ports at all that may accept jobs, "unavailable" is determined.

The status where there are no ports that are capable of accepting jobs refers to the status where no new jobs are acquirable.

The storage resource (hereinafter referred to as image processing/storage resource or also simply as resource) corresponds to a storage area used to execute the function requested for the acquired job or a part that performs, for example, an image generation process that is a rendering process to generate an image or an image conversion process to convert the resolution of the image that is generated for fax transmission. The image generation process and the image conversion process are performed by the image processor 14.

The image processing apparatus MFP includes one or more storage resources.

In a case where there is a plurality of resources, for example, when the resources includes one or more usable resources, "available" is determined.

Here, the status where there are one or more ports that are capable of accepting jobs and there are one or more usable storage resources refers to the status where a new job is acquirable.

"Available" may be determined when there are two or more available resources in consideration of the margin of resource usage.

Conversely, when there are no usable and available resources at all, "unavailable" is determined.

With regard to the presence or absence of the function being executed, "function present" for the function being executed is determined when there is at least one function that is currently being executed by the image processing apparatus MFP, and "function absent" for the function being executed is determined when there is no function that is currently being executed.

In FIG. 4, the completion notification switching condition 43 describes the conditions for switching the current completion notification information from Type A to Type B and from Type B to Type A.

For example, when the port is "available", the storage resource is "available", and the function being executed is "function absent", it means that the current completion notification information is switched from Type B to Type A.

This case corresponds to the status where there is no function currently being executed and a new job is acquirable, and the switch is made to Type A corresponding to the job execution completion time.

In this case, a job is acceptable, there is no function being executed, and there is an available storage resource, and therefore, in this status, when a new job is accepted, the process for the job may be immediately executed.

Therefore, the current completion notification information, which indicates the timing for transmitting the process completion notification of the job to the information processing apparatus TE, is changed to Type A and, when the execution of the requested function normally terminates, the process completion notification is transmitted to the information processing apparatus TE.

When there are enough ports and storage resources, the further subsequent job is acceptable in this status, and therefore there is a low possibility of waiting until the subsequent job is accepted, even with Type A.

Conversely, when the port is "unavailable" and the function being executed is "function present", it means that the current completion notification information is switched from Type A to Type B, regardless of the availability of resources.

This case corresponds to the status where there is the function currently being executed and no new job is acquirable, and the switch is made to Type B corresponding to the job acquisition completion time.

In this case, there is no port that accepts the job, and therefore actually the further subsequent job is not acceptable in this status.

However, there is a possibility that the process of the function currently being executed progresses and the port becomes available.

Therefore, the current completion notification information is changed to Type B, and thus the process completion notification is transmitted to the information processing apparatus TE at the job acquisition completion time, even though the execution of the requested function is not actually complete.

As the process completion notification is transmitted to the information processing apparatus TE, the information processing apparatus TE determines that the process of the current job being executed in the image processing apparatus MFP terminated and determines that the image processing apparatus MFP is in the status so as to transmit the process request for the subsequent job.

When the port is in an available status after the process completion notification is transmitted to the information processing apparatus TE at the job acquisition completion time, the image processing apparatus MFP is in the status so as to accept the process request for the subsequent job from the information processing apparatus TE and may start the process regarding the acceptance for the subsequent job earlier.

That is, as the process completion notification is transmitted to the information processing apparatus TE at the job acquisition completion time, the waiting time for acceptance of the subsequent job may be reduced, or the situation of waiting for acceptance of the subsequent job may be eliminated, and the processing efficiency of a plurality of jobs requested by the information processing apparatus TE may be improved.

As described above, the current completion notification information 44 is information indicating the timing for transmitting the process completion notification for the function requested by the job to the information processing apparatus TE and is used to determine the timing for transmitting the process completion notification.

Either Type A or Type B is set depending on the current status of the condition items of the completion notification switching condition 43 described above.

FIG. 5 is an explanatory diagram of the information (the current completion notification information) stored in the storage of the image processing apparatus according to an embodiment.

When the current completion notification information 44 is set to "Type A", it means that the timing for transmitting the process completion notification of the job to the information processing apparatus TE is "the job execution completion time".

When the current completion notification information 44 is set to "Type B", it means that the timing for transmitting the process completion notification of the job to the information processing apparatus TE is "the job acquisition completion time".

The job management information 45 is the information about a job accepted by the image processing apparatus MFP.

FIG. 6 is an explanatory diagram of the information (job management information) stored in the storage of the image processing apparatus according to an embodiment.

The job management information 45 in FIG. 6 describes, for each job, job ID, job type, job file name, current operation status (status), and acceptance time.

The job ID, job type, and job file name are acquired from the job process request transmitted from the information processing apparatus.

As the acceptance time, the time when the job information is received may be set after the job is acceptable.

The current operation status (status) is set corresponding to the progress status of the process of the job.

The job management information 45 is not limited to these pieces of information, and for example information such as the destination fax number, the number of times of retransmission and the retransmission interval in the case of fax transmission, and the necessity of a result printout in the case of fax transmission, may be stored as attached information of the job.

The job management information 45 in FIG. 6 describes the information in a case where three jobs are accepted.

For example, for a job with a job ID "JOB01", the information is stored such that the job type is "fax" and the requested function is fax transmission, the job file name is "FL01" and the file of the image data to be processed is "FL01", and the acceptance time is "10:00".

As the current operation status (status) of the job with the job ID "JOB01" is currently "ST3", it means normal termination and indicates the operation status where the process of the job normally terminated.

When the current completion notification information 44 is "Type A", it means the operation status where the process of the job was actually executed and normally terminated, while the current completion notification information 44 is "Type B", it means the operation status at the job acquisition completion time as the process of the job has not yet been executed.

For a job with a job ID "JOB02", the information is stored such that the job type is "fax" and the requested function is fax transmission, the job file name is "FL02" and the file of the image data to be processed is "FL02", and the acceptance time is "10:05".

As the current operation status (status) of the job with the job ID "JOB02" is currently "ST2", it means executing fax transmission and indicates the operation status where the process of the job is currently in progress.

For a job with a job ID "JOB03", the information is stored such that the job type is "printing" and the requested function is a printing process, the job file name is "FL03" and the file of the image data to be processed is "FL03", and the acceptance time is "10:10".

As the current operation status (status) of the job with the job ID "JOB03" is currently "ST5", it means executing the printing process and indicates the operation status where the process of the job is currently in progress.

The number of available ports 46 stored in the storage 40 in FIG. 1 refers to the number of ports that are currently usable.

For example, when the total number of ports included in the image processing apparatus MFP is three and the number of ports currently in use is one, the number of available ports 46 is set to two.

The number of available resources 47 refers to the number of resources that are currently usable.

For example, when the total number of resources included in the image processing apparatus MFP is three and the number of resources currently in use are two, the number of available resources 47 is set to one.

Figure 7:
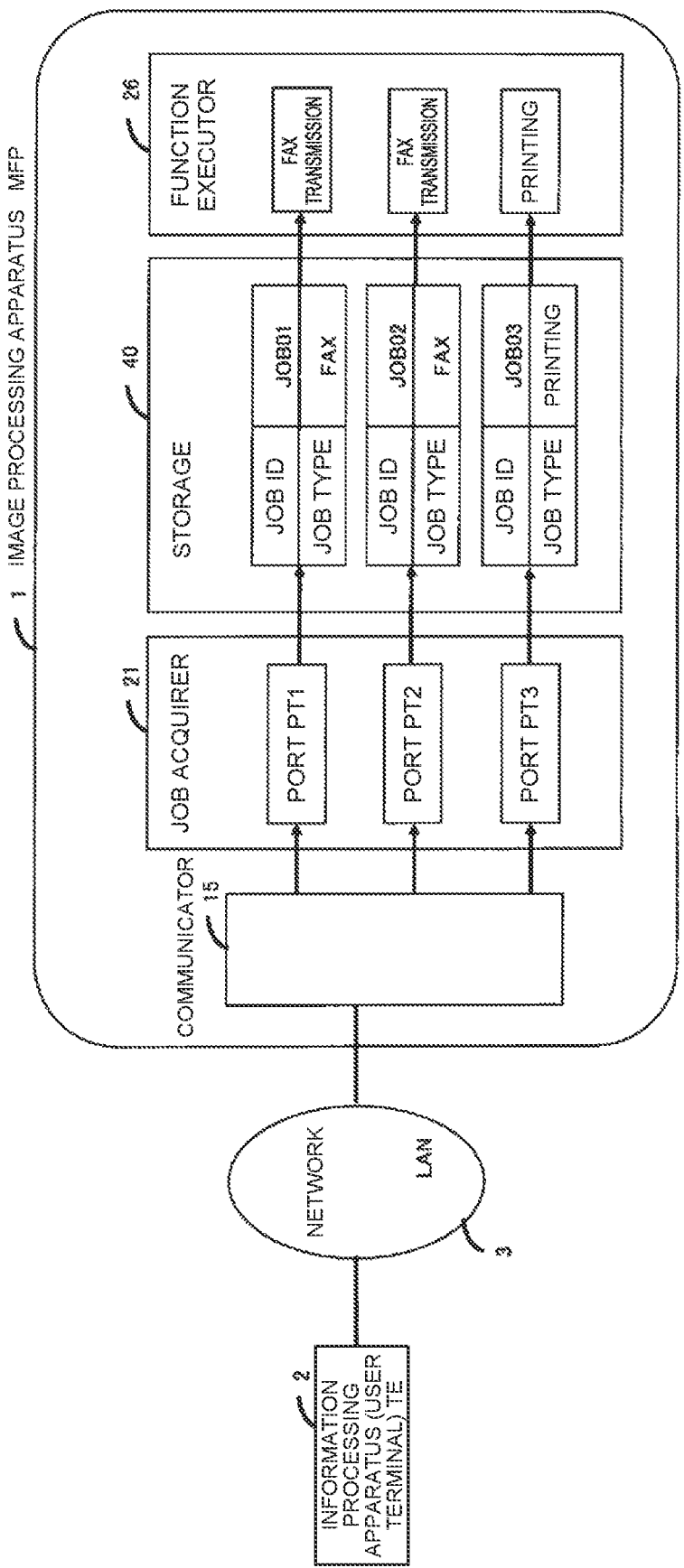
FIG. 7 is an explanatory diagram regarding a process to acquire a job transmitted from the information processing apparatus in the image processing apparatus according to an embodiment of the present disclosure.

FIG. 7 is an explanatory diagram regarding the process to acquire the job transmitted from the information processing apparatus in the image processing apparatus according to an embodiment.

In the case described here, the three jobs illustrated in FIG. 6 above have been acquired.

The number of ports included in the image processing apparatus MFP is three, and there are ports (PT1, PT2, and PT3).

As there are three ports that accept jobs, the respective ports receive the three jobs.

First, in the image processing apparatus MFP, when the job JOB01 is received from the information processing apparatus TE in the status where the three ports are available, the job JOB01 is acquired by the port PT1 and the job information (the job ID "JOB01", the job type "fax") thereof is stored in the storage 40.

In the status where the resource of the image processing apparatus MFP is also available and fax transmission is possible, the function executor 26 executes fax transmission for the job with the job ID "JOB01".

In this status, the port PT1 is in a used status and the ports PT2 and PT3 are in an available status.

Subsequently, in the image processing apparatus MFP, when the job JOB02 is received from the information processing apparatus TE in the status where the two ports (PT2 and PT3) are available, the job JOB02 is acquired by the port PT2 and the job information (the job ID "JOB02", the job type "fax") thereof is stored in the storage 40.

In the status where the resource of the image processing apparatus MFP is also available and fax transmission is possible, the function executor 26 executes fax transmission for the job with the job ID "JOB02".

However, when fax transmission of the job with the job ID "JOB01" is being executed and fax transmission of the job with the job ID "JOB02" is difficult, the process of the job JOB02 enters a waiting status.

In this status, the ports PT1 and PT2 are in a used status, and the port PT3 is in an available status.

Subsequently, in the image processing apparatus MFP, when the job JOB03 is received from the information processing apparatus TE in the status where the one port (PT3) is available, the job JOB03 is acquired by the port PT3 and the job information (the job ID "JOB03", the job type "printing") is stored in the storage 40.

In the status where the resource of the image processing apparatus MFP is also available and printing is possible, the function executor 26 executes the printing process for the job with the job ID "JOB03".

In this status, all the three ports are in a used status, and there are no available ports in this status.

In the status where there are no available ports, even when the process request for a new job JOB04 is transmitted from the information processing apparatus TE, the new job JOB04 is not acceptable.

For the new job JOB04, the acceptance itself has to wait.

Configuration of Information Processing Apparatus

Figure 2:
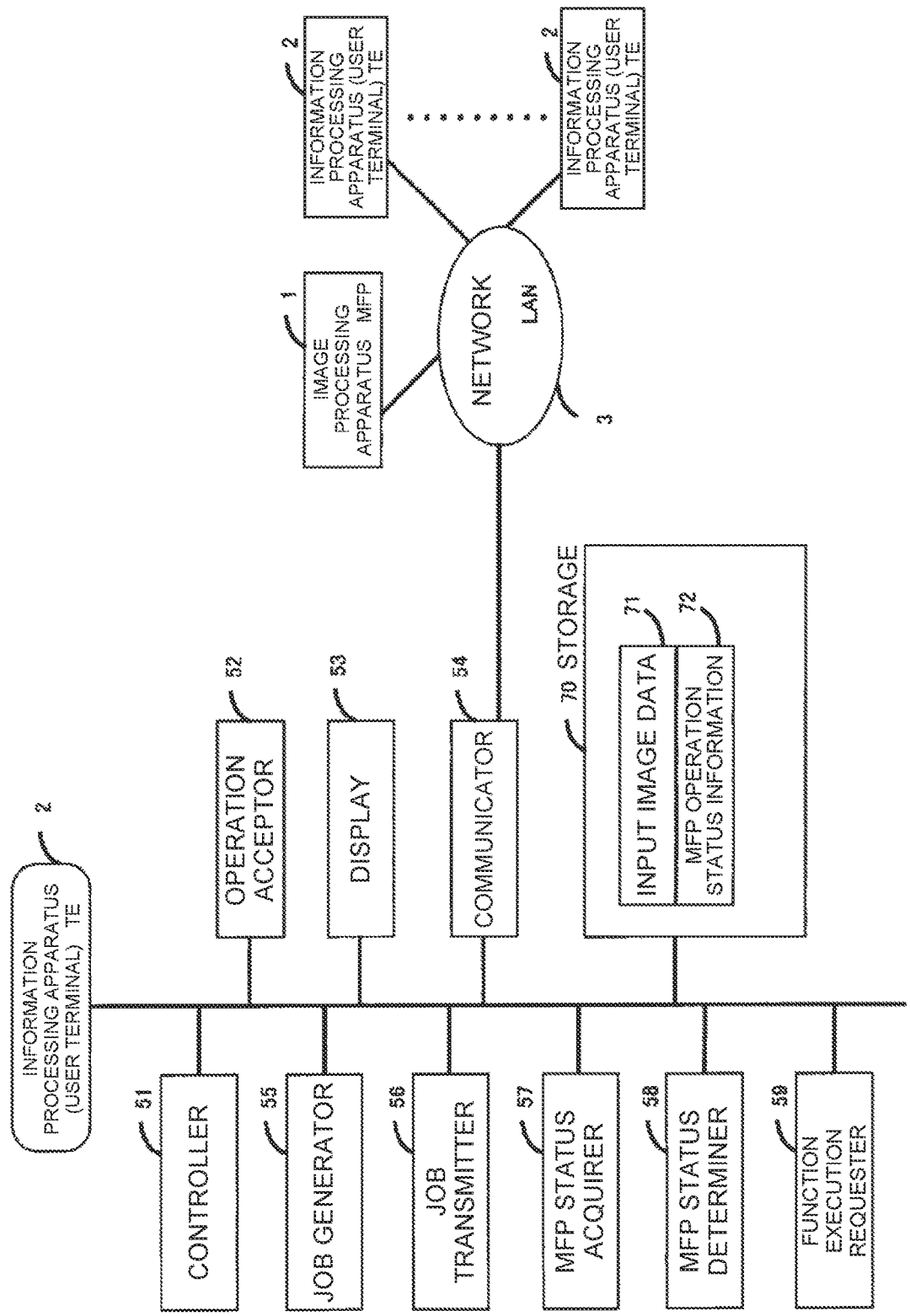
FIG. 2 is a configuration block diagram of an information processing apparatus according to an embodiment of the present disclosure.

FIG. 2 is a configuration block diagram of the information processing apparatus according to an embodiment of the present disclosure.

The information processing apparatus is primarily an apparatus that generates a job including image data that is the target to be processed by the image processing apparatus and, as described above, corresponds to for example a personal computer or mobile terminal owned by the user.

In FIG. 2, the information processing apparatus (TE) 2 primarily includes a controller 51, an operation acceptor 52, a display 53, a communicator 54, a job generator 55, a job transmitter 56, an MFP status acquirer 57, an MFP status determiner 58, a function execution requester 59, and a storage 70.

The controller 51 is a part that controls an operation of each component, such as the operation acceptor and the job generator, and is primarily implemented by a microcomputer including a CPU, a ROM, a RAM, an I/O controller, a timer, and the like.

The CPU organically operates various types of hardware based on a control program previously stored in the ROM, or the like, to perform a job generation function, and the like, according to one aspect of the present disclosure.

The operation acceptor 52 is a part through which the user of the information processing apparatus inputs information and is an input device for performing predetermined input operations to operate the information processing apparatus. For example, it is a part that inputs information such as characters and selects and inputs functions and uses a keyboard, a mouse, a touch panel, etc.

Examples of the keys operated by the user include an operation start key, a function selection key, and a setting key.

For example, the user performs an input operation on a touch panel or an operation start key and thus executes a job generation function, a job transmission function, etc.

The display 53 is a part that displays information and displays the information needed to execute each function, a result of execution of a function, and the like, in order to notify it to the user. For example, an LCD, an organic EL display, or the like, is used, and when a touch panel is used as the operation acceptor 52, the display 53 and the touch panel are arranged in a superimposed manner.

The display 53 uses characters, symbols, figures, images, icons, animations, moving images, and the like, to display for example the information necessary to set the setting items used for job generation, and the like, and to request the execution of the printing function, and the like, to the image processing apparatus, the operation screen of the selected function, the progress status of the process of the job, and the information indicating normal termination of the job.

The communicator 54 is a part that communicates information via a network and that communicates data with the image processing apparatus and other information processing apparatus.

For example, the job including the input image data is transmitted to the image processing apparatus MFP via the network 3.

As described below, the acceptance permission notification indicating the permitted acceptance of the job, the job normal termination notification indicating normal processing of the job, and the like, are received from the image processing apparatus MFP.

The job generator 55 is a part that generates the job to be transmitted to the image processing apparatus MFP.

For example, the image data to be processed by the image processing apparatus MFP is created or the image data is input and thus stored as input image data 71 in the storage 70.

The job information is generated by adding, to the input image data, the user name of the user who input the image data, the identification information (IP address) of the information processing apparatus TE, the information (job type) indicating the type of process of the job, the name (job ID) of the job, etc.

The job transmitter 56 is a part that transmits the generated job information to the image processing apparatus MFP.

According to the embodiment described below, the job process request for requesting the process of the job is transmitted to the image processing apparatus MFP and, when the acceptance of the job requested by the job process request is permitted, the job information including the input image data itself to be processed is transmitted to the image processing apparatus MFP.

The MFP status acquirer 57 is a part that acquires the current MFP operation status (status) transmitted from the image processing apparatus MFP. The acquired current operation status (status) is stored as MFP operation status information 72.

For example, when the acceptance permission notification is received from the image processing apparatus MFP, the operation status (status) included in the acceptance permission notification is acquired and stored as the MFP operation status information 72.

As the operation status (status), any of the statuses described in the operation status setting information 42 illustrated in FIG. 3 is acquired.

The acquired status is displayed on the display 53, for example, and is used to determine the subsequent process in the information processing apparatus TE.

The MFP status determiner 58 is a part that determines the current operation status of the image processing apparatus MFP based on the acquired status.

Based on the determined current operation status of the image processing apparatus MFP, the subsequent process to be performed by the information processing apparatus TE is determined.

For example, when the acquired status is "ST2", it is determined that the requested fax transmission is currently being executed in the image processing apparatus MFP, and the display 53 may present that the fax transmission is currently being executed.

Alternatively, when the acquired status is "ST3", it is determined that the requested function was executed and normally terminated in the image processing apparatus MFP, and the display 53 may present that the requested function normally terminated.

The function execution requester 59 is a part that transmits the job process request for requesting the execution of a predetermined function to the image processing apparatus MFP.

The job process request includes, for example, the user name of the user requesting the process, the identification information (IP address) of the information processing apparatus TE, the information (job type) indicating the type of process of the job, the name (job ID) of the job, etc.

When the job process request is transmitted to the image processing apparatus MFP, it is unknown whether the job process request is permitted and, in some operation status of the image processing apparatus MFP, the job process request may be unpermitted.

Therefore, the job process request may exclude the image data itself for which the process is requested.

For the job process request, the information on the job to be requested is first transmitted to the image processing apparatus MFP to check whether the image processing apparatus MFP may accept it, and when the image processing apparatus MFP is in the status so as to accept it, the image processing apparatus MFP transmits a permission notification, and then the information processing apparatus transmits the image (regardless of the size of the data).

The storage 70 is a part that stores information and programs necessary for executing each function of the information processing apparatus TE according to one aspect of the present disclosure and uses a semiconductor storage device such as a ROM, a RAM, or a flash memory, a storage device such as an HDD or an SSD, and other storage media.

The storage 70 stores, for example, the input image data 71 and the MFP operation status information 72.

As described above, the input image data 71 is image data input by the information processing apparatus TE and is image data that is subjected to a process such as printing by the image processing apparatus MFP.

The input image data 71 is included in the job information and is transmitted to the image processing apparatus MFP.

As described above, the MFP operation status information 72 is the current MFP operation status (status) transmitted from the image processing apparatus MFP.

Schematic Description of Process Progress Status of Acquired Job

The progress status of the process of the job executed by the image processing apparatus MFP according to one aspect of the present disclosure will be described below.

As described above, the process completion notification is transmitted to the information processing apparatus TE at a different timing depending on whether the current completion notification information is Type A or Type B.

When the current completion notification information is Type B, the process completion notification indicating normal termination is transmitted to the information processing apparatus TE and then the execution of the process of the requested job starts.

Conversely, when the current completion notification information is Type A, the execution of the process of the requested job normally terminates and then the process completion notification indicating normal termination is transmitted to the information processing apparatus TE.

When the process completion notification indicating normal termination is transmitted to the information processing apparatus TE regardless of whether the current completion notification information is Type A or Type B, the port having accepted the job is released. The released port enters a usable status (available port) so as to accept the subsequently requested job.

Figure 8:
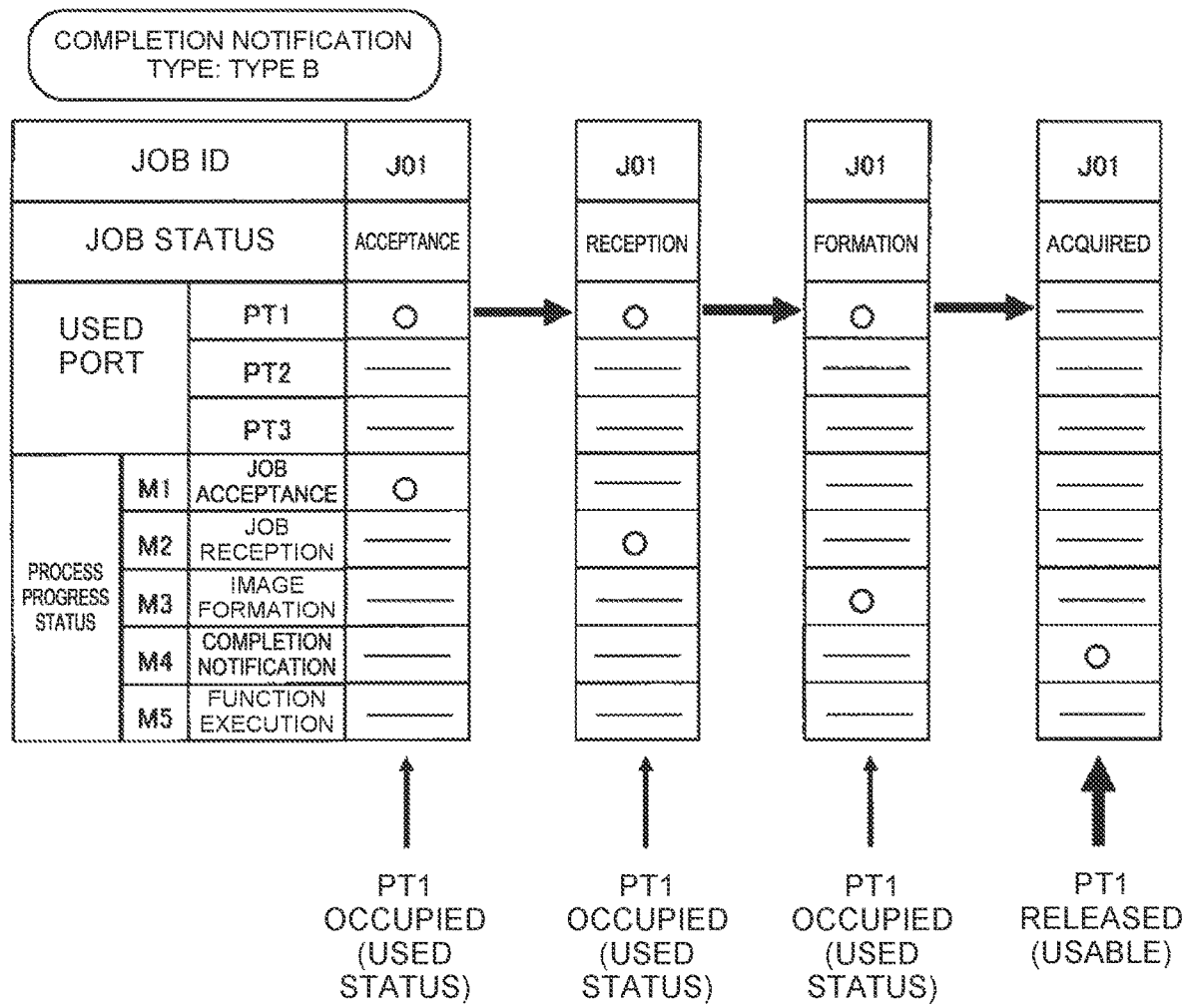
FIG. 8 is an explanatory diagram illustrating a process progress status of an acquired job when the current completion notification information is Type B in the image processing apparatus according to an embodiment of the present disclosure.

Description of Process Progress Status of Job Acquired when Current Completion Notification Information is Type B FIG. 8 is an explanatory diagram illustrating the process progress status of the acquired job when the current completion notification information is Type B in the image processing apparatus according to an embodiment.

FIG. 8 illustrates the process progress status of the job when the current completion notification information is Type B and one job (job ID: J01) is accepted.

The image processing apparatus MFP includes the three ports (PT1, PT2, and PT3) that accept jobs and, in the initial status, they are all in a usable status (available ports).

The process progress statuses of the job include five statuses (M1 to M5), "job acceptance", "job reception", "image formation", "completion notification", and "function execution".

"Job acceptance" refers to the status where the job process request is being accepted from the information processing apparatus TE.

"Job Reception" refers to the status where the job information is being received from the information processing apparatus TE.

"Image formation" refers to the status where the image formation process is being performed on the image data included in the received job.

"Completion notification" refers to the status where the process completion notification indicating normal termination is being transmitted to the information processing apparatus TE.

"Function execution" refers to the status where the function requested by the job process request is being executed for the image data having undergone the image formation process.

In FIG. 8, first, when the job process request is received from the information processing apparatus TE, the status enters "job acceptance". At this point, as all the three ports are available, for example the port PT1 is used to accept the job process request.

FIG. 8 illustrates that, when the job status is "acceptance", the port used is PT1 and the process progress status is the "job acceptance" M1.

The port PT1 enters an occupied status (used status) and is no longer an available port.

When the job process request is received, it is determined whether the requested job is acceptable and, when it is acceptable, the job information including the image data to be processed, which is transmitted from the information processing apparatus TE, is received.

The job information is received by the port PT1, the job status enters "reception", and the process progress status enters the "job reception" M2.

The port PT1 remains in an occupied status (used status).

When the job information is received, the necessary image formation process is executed for the image data included in the job information in order to perform the requested process.

For example, when the requested process is printing, the image data is converted into printable data by using a predetermined storage resource.

In this case, the job status enters "formation", and the process progress status enters the "image formation" M3.

The port PT1 remains in an occupied status (used status).

After the image formation process is executed, the requested process may be executed in this status, and therefore it is assumed that the process regarding job acceptance terminated and the job acquisition completion time is obtained.

That is, when the process progress status changes from M1 to M3, it is determined that the job acquisition completion time is obtained, and the job status changes to "acquired".

As described above, when the current completion notification information is Type B, the process completion notification (job normal termination notification) is transmitted to the information processing apparatus TE at the job acquisition completion time.

In this case, the job status enters "acquired", and the process progress status enters the "completion notification" M4.

After the process completion notification (job normal termination notification) is transmitted to the information processing apparatus TE, the port PT1 used is released.

Specifically, the port PT1 is returned to a usable status (available port) so that the port PT1 may accept the subsequent job process request in this status.

In this status, although the requested process has not yet actually been executed, the process regarding job acceptance has terminated, and therefore the subsequent job process request is acceptable.

Then, a predetermined function is executed for the image data that has undergone the image formation process and has entered the status so as to execute the requested process, and the process progress status enters the "function execution" M5.

In a case where a series of processes proceeds as described above, when the information processing apparatus TE receives the process completion notification (job normal termination notification), it recognizes that the process of the requested job is complete and therefore may transmit the process request for the subsequent job to the image processing apparatus MFP.

Thus, in the case of FIG. 8, as the port PT1 is released, the process request for the subsequent job is acceptable even when the function is actually being executed by the image processing apparatus MFP.

In the case of FIG. 8, the process progress status proceeds from M1 to M4 in this order, but it is not limited thereto, and the process completion notification may be transmitted to the information processing apparatus TE after the "job reception" M2, and the "completion notification" M4 may be obtained. That is, the process progress statuses may proceed, starting from the "job acceptance" M1, the "job reception" M2, the "completion notification" M4, the "image formation" M3, and then the "function execution" M5 in this order.

Figure 9:
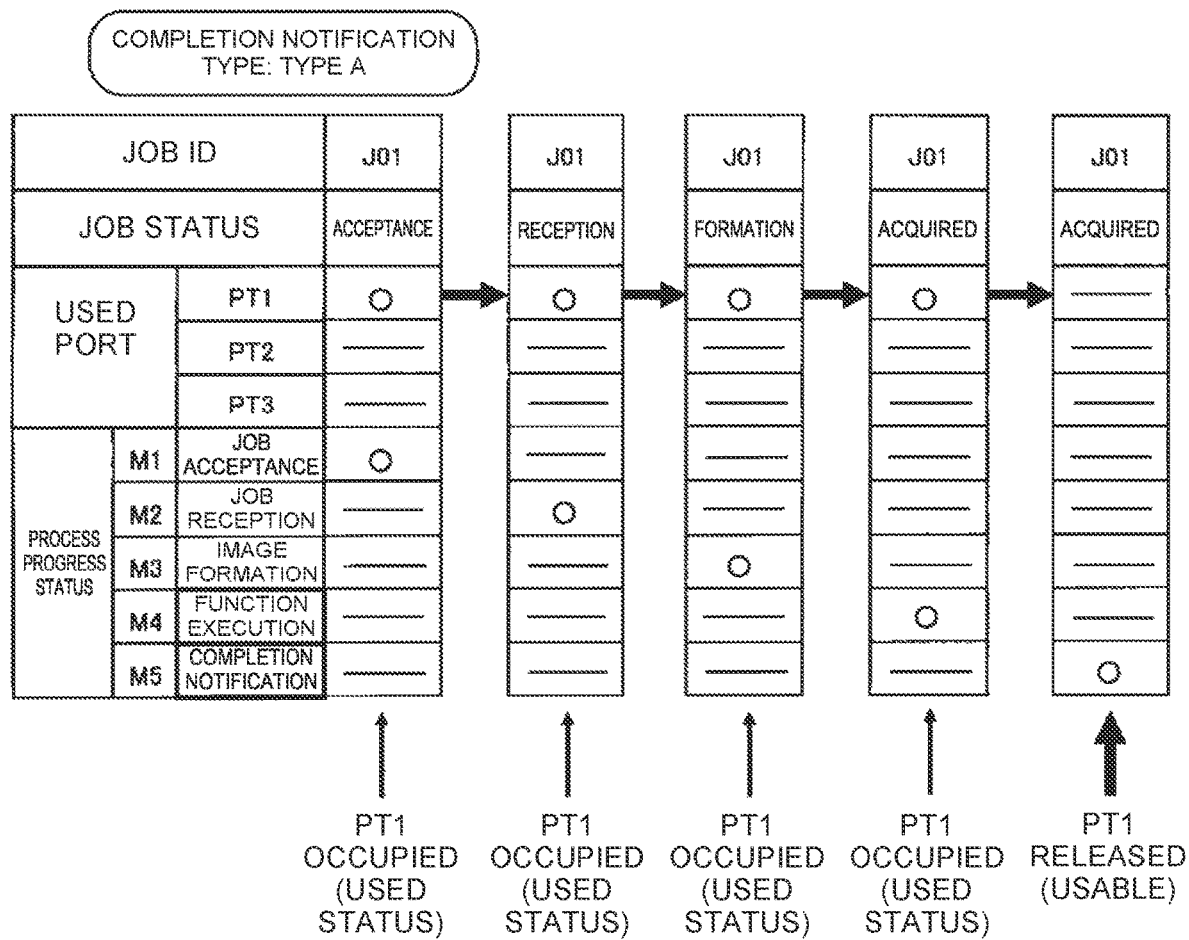
FIG. 9 is an explanatory diagram illustrating a process progress status of an acquired job when the current completion notification information is Type A in the image processing apparatus according to an embodiment of the present disclosure.

Description of Process Progress Status of Job Acquired when
Current Completion Notification Information is Type A FIG. 9 is an explanatory diagram illustrating the process progress status of the acquired job when the current completion notification information is Type A in the image processing apparatus according to an embodiment.

FIG. 9 illustrates the process progress status of the job when the current completion notification information is Type A and one job (job ID: J01) is accepted.

The image processing apparatus MFP includes the three ports (PT1, PT2, and PT3) that accept jobs and, in the initial status, they are all in a usable status (available ports).

In FIG. 9, too, when the job process request is received from the information processing apparatus TE, the status enters "job acceptance" and, as in FIG. 8, the port PT1 is used to accept the job process request.

Then, as in FIG. 8, it is determined whether the requested job is acceptable and, when it is acceptable, the job information including the image data to be processed, which is transmitted from the information processing apparatus TE, is received, the job status enters "reception", and the process progress status enters the "job reception" M2.

Further, after the job information is received, the necessary image formation process is executed for the image data included in the job information, and then the job status enters "formation" and the process progress status enters the "image formation" M3. The port PT1 remains in an occupied status (used status).

Up to this point, it is the same as the process progress status in FIG. 8.

In FIG. 9, when the current completion notification information is Type A, the process completion notification (job normal termination notification) is transmitted to the information processing apparatus TE at the job execution completion time.

As described above, the process progress status is the status of the "image formation" M3 at the job acquisition completion time, not at the job execution completion time, and therefore the process completion notification (job normal termination notification) is not yet transmitted to the information processing apparatus TE.

Subsequently, in FIG. 9, after the image formation process is executed, the requested process may be executed in this status, and therefore the predetermined function is executed for the image data having undergone the image formation process, the job status enters "acquired", and the process progress status enters the "function execution" M4.

Even during the execution of the function, the process completion notification (job normal termination notification) is not transmitted to the information processing apparatus TE, and thus the port PT1 remains in an occupied status (used status).

Therefore, with the use of the port PT1, it is difficult to accept the subsequent job process request in this status.

As the information processing apparatus TE has not received the process completion notification (job normal termination notification), it is unable to recognize that the process of the requested job is complete and is unable to transmit the process request for the subsequent job to the image processing apparatus MFP in this status.

When the function executed for the image data terminates, the job execution completion time is obtained.

In FIG. 9, the current completion notification information is Type A, and therefore the process completion notification (job normal termination notification) is transmitted to the information processing apparatus TE when the function terminates.

When the process completion notification (job normal termination notification) is transmitted to the information processing apparatus TE, the job status enters "acquired", and the process progress status enters the "completion notification" M5.

After the process completion notification (job normal termination notification) is transmitted to the information processing apparatus TE, the port PT1 used is released.

Specifically, the port PT1 is returned to a usable status (available port) so that the port PT1 may accept the subsequent job process request in this status.

In the case of the process progress in FIG. 9, the used port PT1 is released and the subsequent job process request becomes acceptable by the port PT1 in the status after the execution of the function for the image data actually terminates; therefore, as compared to the case of the process progress in FIG. 8, in which the port PT1 is released before the execution of the function for the image data starts, the status where the subsequent job process request may be accepted is obtained in a delayed timing.

Thus, in other words, as the information processing apparatus TE receives the process completion notification (job normal termination notification) in a delayed timing, the status where it is difficult to transmit the process request for the subsequent job to the image processing apparatus MFP may continue for a long time.

As described above, when the current completion notification information is Type A, it may be difficult to transmit the process request for the subsequent job, but when the current completion notification information is Type B, the process completion notification is transmitted to the information processing apparatus TE at the job acquisition completion time, which makes it possible to reduce the waiting time for acceptance of the subsequent job, or eliminate the situation of waiting for acceptance of the subsequent job, and improve the processing efficiency of a plurality of jobs requested by the information processing apparatus TE.

Description of Process Progress Status of Plurality of Jobs Acquired when Current Completion Notification Information is Type B FIGS. 10, 11, and 12 are explanatory diagrams illustrating the process progress statuses of a plurality of jobs when the current completion notification information is Type B in the image processing apparatus according to an embodiment.

FIG. 10 illustrates the process progress statuses of the jobs when the current completion notification information is Type B and the three jobs (job IDs: J01, J02, and J03) are continuously accepted.

The image processing apparatus MFP includes the three ports (PT1, PT2, and PT3) that accept jobs, and the processes of the three jobs (job IDs: J01, J02, and J03) progress in the status where the three ports are occupied, but a fourth job (job ID: J04) is not acceptable.

In FIG. 10, the job J01 is accepted by the port PT1 and is currently in the process progress status of M3 (image formation) in which the image formation process is being executed after the process progress statuses of M1 (job acceptance) and M2 (job reception) terminated. In this case, the port PT1 is in an occupied status by the job J01.

The job J02 is accepted by the port PT2 and is currently in the process progress status of M2 (job reception) in which the job information is being received after the process progress status of M1 (job acceptance) terminated. In this case, the port PT2 is in an occupied status by the job J02.

Furthermore, the job J03 is accepted by the port PT3 and is currently in the process progress status of M1 (job acceptance) and in the status where the acceptance of the job has been permitted.

In this case, the port PT3 is in an occupied status by the job J03.

In the above situation, as all the ports are occupied, there are no usable ports, and no process requests for new jobs are acceptable in this status.

Therefore, even when the job process request for the job J04 is received, the job process request is rejected during an acceptance/rejection determination process because there are no available ports and, for example, a non-acceptance notification for the job J04 is transmitted to the information processing apparatus TE.

FIG. 11 illustrates the process progress status that is one step advanced from the process progress status in FIG. 10.

In FIG. 11, the job J01 is in the process progress status of M4 (completion notification) after the process progress statuses of M1 (job acceptance), M2 (job reception), and M3 (image formation) terminate.

Here, as the current completion notification information is Type B, the process completion notification for the job J01 is transmitted to the information processing apparatus TE at the job acquisition completion time when M3 (image formation) terminates, as described above.

In this case, as the process completion notification is transmitted to the information processing apparatus TE, the port PT1 is released to become an available port so as to be used by the subsequent new job in this status.

The job J02 accepted by the port PT2 is currently in the process progress status of M3 (image formation) in which the image formation process is being executed after the process progress statuses of M1 (job acceptance) and M2 (job reception) terminated. In this case, the port PT2 is still in an occupied status by the job J02.

The job J03 accepted by the port PT3 is currently in the process progress status of M2 (job reception) in which the job information is being received after the process progress status of M1 (job acceptance) terminated. In this case, the port PT3 is still in an occupied status by the job J03.

Furthermore, when the process request for the new job J04 is transmitted from the information processing apparatus TE, the job process request for the job J04 is received by the usable port PT1, as the port PT1 is an available port.

When the job process request for the job J04 is received and the job process request is permitted during the acceptance/rejection determination process, the acceptance permission notification is transmitted to the information processing apparatus TE, and the process progress status enters M1 (job acceptance).

In this case, the port PT1 is in an occupied status by the job J04.

After the port PT1 is in an occupied status by the job J04, all the ports are in an occupied status, and therefore, even when the process request for a new job J05 is transmitted from the information processing apparatus TE, the job process request is rejected during the acceptance/rejection determination process as there are no available ports, and the non-acceptance notification for the job J05 is transmitted to the information processing apparatus TE.

FIG. 12 illustrates the process progress status, which is one step advanced from the process progress status in FIG. 11.

In FIG. 12, the job J01 is in the process progress status of M5 (function execution) after the process progress statuses of M1 (job acceptance), M2 (job reception), M3 (image formation), and M4 (completion notification) terminate.

In this case, the port PT1 has already been unoccupied by the job J01 and is now in an occupied status by the another job J04.

The job J02 is in the process progress status of M4 (completion notification) after the process progress statuses of M1 (job acceptance), M2 (job reception), and M3 (image formation) terminate.

Here, as the current completion notification information is Type B, the process completion notification for the job J02 is transmitted to the information processing apparatus TE at the job acquisition completion time when M3 (image formation) terminates, as described above.

In this case, as the process completion notification is transmitted to the information processing apparatus TE, the port PT2 is released to become an available port so as to be used by the subsequent new job in this status.

The job J03 accepted by the port PT3 is currently in the process progress status of M3 (image formation) in which the image formation process is being executed after the process progress statuses of M1 (job acceptance) and M2 (job reception) terminated. In this case, the port PT3 is still in an occupied status by the job J03.

When the job J04 accepted by the port PT1 is in the process progress status of M1 (job acceptance), the port PT1 is still in an occupied status by the job J04.

Furthermore, when the process request for the new job J05 is transmitted from the information processing apparatus TE, the job process request for the job J05 is received by the usable port PT2 as the port PT2 is an available port.

When the job process request for the job J05 is received and the job process request is permitted during the acceptance/rejection determination process, the acceptance permission notification is transmitted to the information processing apparatus TE, and the process progress status enters M1 (job acceptance).

In this case, the port PT2 is in an occupied status by the job J05.

After the port PT2 is in an occupied status by the job J05, all the ports are in an occupied status, and therefore even when the process request for a new job is transmitted from the information processing apparatus TE, the job process request is rejected as there are no available ports.

Figure 13:
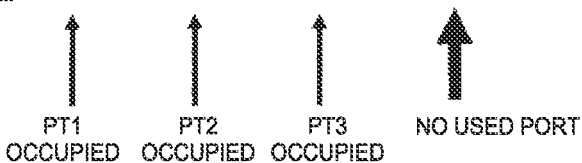
FIG. 13 is an explanatory diagram illustrating process progress statuses of a plurality of jobs when the current completion notification information is Type A in the image processing apparatus according to an embodiment of the present disclosure.
Figure 14:
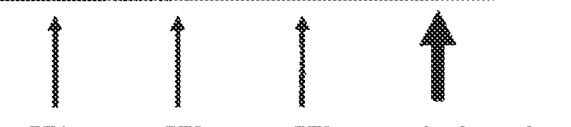
FIG. 14 is an explanatory diagram illustrating the process progress statuses of the jobs when the current completion notification information is Type Ain the image processing apparatus according to an embodiment of the present disclosure.
Figure 15:
FIG. 15 is an explanatory diagram illustrating the process progress statuses of the jobs when the current completion notification information is Type Ain the image processing apparatus according to an embodiment of the present disclosure.

Description of Process Progress Status of Plurality of Jobs Acquired when Current Completion Notification Information is Type A FIGS. 13, 14, and 15 are explanatory diagrams illustrating the process progress statuses of a plurality of jobs when the current completion notification information is Type A in the image processing apparatus according to an embodiment.

FIG. 13 illustrates the process progress statuses of the jobs when the current completion notification information is Type A and the three jobs (job IDs: J01, J02, and J03) are continuously accepted.

The image processing apparatus MFP includes the three ports (PT1, PT2, and PT3) that accept jobs, and the processes of the three jobs (job IDs: J01, J02, and J03) progress in the status where the three ports are occupied, but the fourth job (job ID: J04) is not acceptable.

In the process progress status of the job illustrated in FIG. 13, the current completion notification information is Type A, and only the difference is the current completion notification information from FIG. 10 in which the current completion notification information is Type B, and the process progress status of the job itself is the same as that in FIG. 10.

As the current completion notification information is Type A, the process progress status enters M4 (function execution), in which the function is executed, after the process progress status of M3 (image formation), and then enters M5 (completion notification) in which the process completion notification is transmitted.

As described above, when the current completion notification information is Type A, the process completion notification for the job J01 is transmitted at the job execution completion time and therefore, at the job acquisition completion time when M3 (image formation) terminates, the process completion notification for the job J01 is not transmitted to the information processing apparatus TE, and the function requested for the job J01 is executed.

FIG. 14 illustrates the process progress status, which is one step advanced from the process progress status in FIG. 13.

In FIG. 14, the job J01 is in the process progress status of M4 (function execution) after the process progress statuses of M1 (job acceptance), M2 (job reception), and M3 (image formation) terminate.

Here, as the current completion notification information is Type A, the function requested for the job J01 is executed, and the port PT1 is still in an occupied status by the job J01.

The job J02 accepted by the port PT2 is currently in the process progress status of M3 (image formation) in which the image formation process is being performed after the process progress statuses of M1 (job acceptance) and M2 (job reception) terminated. In this case, the port PT2 is still in an occupied status by the job J02.

The job J03 accepted by the port PT3 is currently in the process progress status of M2 (job reception) in which the job information is being received after the process progress status of M1 (job acceptance) terminated. In this case, the port PT3 is still in an occupied status by the job J03.

Therefore, in the process progress status in FIG. 14, all the ports are still in an occupied status, and therefore, even when the process request for the new job J04 is transmitted from the information processing apparatus TE, the job process request is rejected during the acceptance/rejection determination process as there are no available ports, and the non-acceptance notification for the job J04 is transmitted to the information processing apparatus TE.

FIG. 15 illustrates the process progress status, which is one step advanced from the process progress status in FIG. 14.

In FIG. 15, the job J01 is in the process progress status of M5 (completion notification) after the process progress statuses of M1 (job acceptance), M2 (job reception), M3 (image formation), and M4 (function execution) terminate.

Here, the status where M4 (function execution) terminated is the status where the function requested for the job J01 was executed and the function normally terminated. That is, in FIG. 15, the job execution completion time is obtained for the job J01.

As described above, when the current completion notification information is Type A, the process completion notification for the job J01 is transmitted at the job execution completion time, and therefore the process completion notification for the job J01 is transmitted to the information processing apparatus TE.

As the process completion notification is transmitted to the information processing apparatus TE, the port PT1 is released to become an available port so as to be used by the subsequent new job in this status.

The job J02 is in the process progress status of M4 (function execution) after the process progress statuses of M1 (job acceptance), M2 (job reception), and M3 (image formation) terminate.

Here, as the current completion notification information is Type A, the function requested for the job J02 is executed and the port PT2 is still in an occupied status by the job J02.

The job J03 accepted by the port PT3 is currently in the process progress status of M3 (image formation) in which the image formation process is being performed after the process progress statuses of M1 (job acceptance) and M2 (job reception) terminated. In this case, the port PT3 is still in an occupied status by the job J03.

When the process request for the new job J04 is transmitted from the information processing apparatus TE, the job process request for the job J04 is received by the usable port PT1, as the port PT1 is an available port.

When the job process request for the job J04 is received and the job process request is permitted during the acceptance/rejection determination process, the acceptance permission notification is transmitted to the information processing apparatus TE, and the process progress status enters M1 (job acceptance).

In this case, the port PT1 is in an occupied status by the job J04.

After the port PT1 is in an occupied status by the job J04, all the ports are in an occupied status, and as there is no available port, the process request for the new job is rejected.

As illustrated in FIG. 15, when the current completion notification information is Type A, the port PT1 is released to become an available port, not at the job acquisition completion time, but at the job execution completion time when the function requested for the job J01 was executed and normally terminated, and therefore, the port PT1 is released in a delayed timing as compared to the case where the current completion notification information is Type B.

Figure 16:
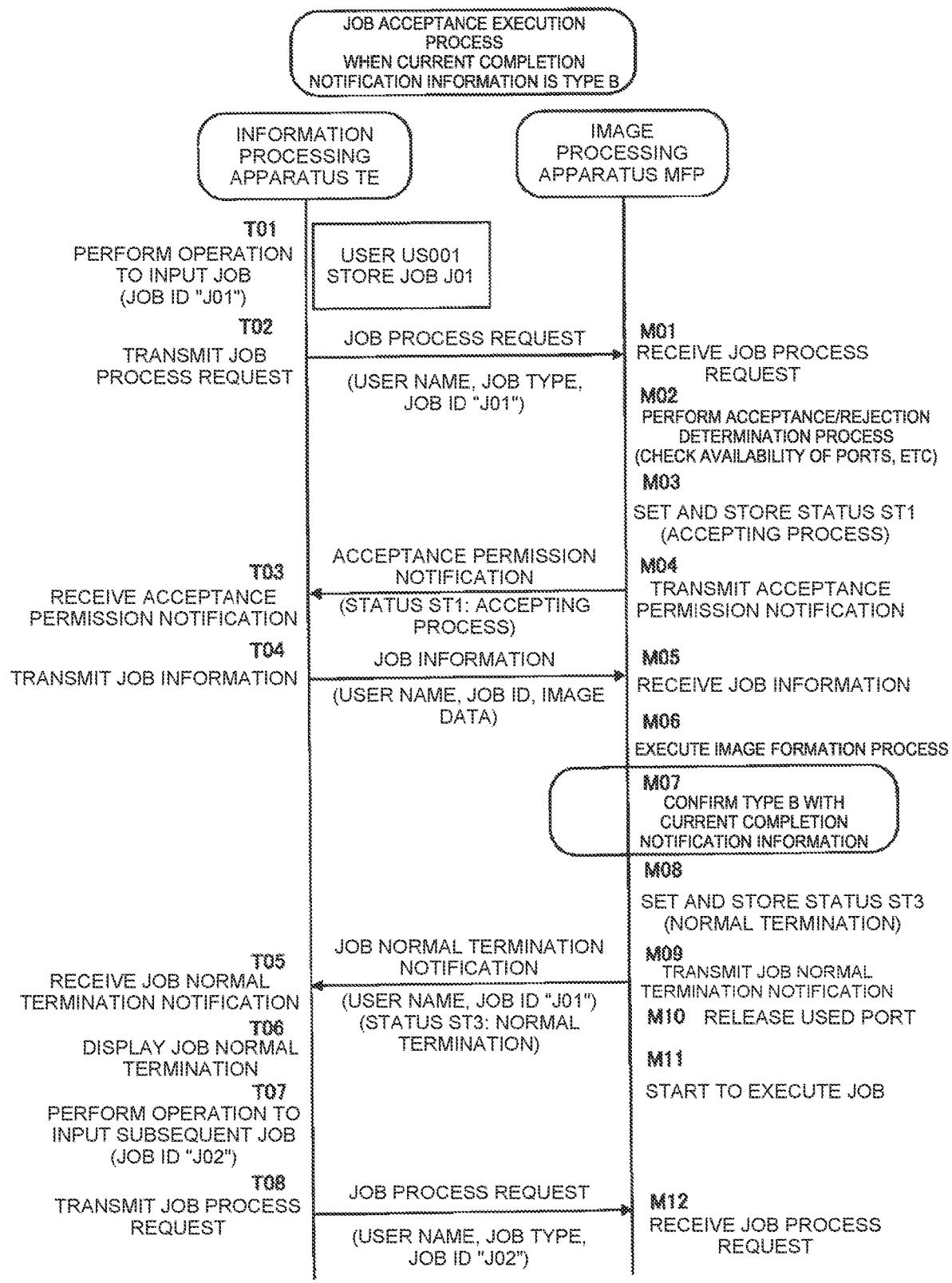
FIG. 16 illustrates a communication sequence of a job acceptance execution process performed between the image processing apparatus and the information processing apparatus when the current completion notification information is Type B according to an embodiment.

Communication Sequence of Job Acceptance Execution Process when Current Completion Notification Information is Type B FIG. 16 illustrates a communication sequence of a job acceptance execution process performed between the image processing apparatus and the information processing apparatus when the current completion notification information is Type B according to an embodiment.

Here, as the current completion notification information is Type B, the process completion notification (job normal termination notification) of the job is transmitted to the information processing apparatus TE at the job acquisition completion time, i.e., before the execution of the function for the job starts.

At Step T01 in FIG. 16, a user US001 performs a predetermined input operation in the information processing apparatus TE to input the job with the job ID "J01" and store the image data included in the job.

At this point, the user US001 also inputs the function to be executed for the job with the job ID "J01".

For example, the user US001 inputs the printing function, fax transmission function, etc., and also inputs the information necessary to execute each function. For the printing function, the number of print copies and the print sheet are designated and, for the fax transmission function, the transmission destination is input.

At Step T02, when the user designates the image processing apparatus MFP, which is to execute the function, and performs an input operation to execute the function, the job process request is transmitted to the image processing apparatus MFP.

The job process request includes, for example, the user name, the job type, the job ID "J01", the image resolution (main scan/sub-scan), the number of times of retransmission and the retransmission interval in the case of fax transmission, the necessity of a result printout in the case of fax transmission, the login name and login password for user authentication, and the destination fax number.

At Step M01, the image processing apparatus MFP receives the job process request.

At Step M02, the acceptance/rejection determination process of the job is performed.

Here, the availability of ports and the availability of storage resources in the image processing apparatus MFP are checked.

For example, when there are one or more available ports among the ports included in the image processing apparatus MFP and when there is an available storage resource to receive the image data included in the requested job and to perform the process regarding acceptance of the job, it is determined that the job is acceptable.

In principle, one job is accepted by one port, but as a plurality of jobs is acceptable by one port, the number of acceptable jobs may be previously set for each port, and the acceptability of the job may be determined by also using the number of acceptable jobs.

At Step M03, when the job is acceptable, ST1 (accepting the process) is set and stored as the current operation status (status).

Here, as the job with the job ID "J01" is acceptable, the information (job ID, job type, acceptance time, etc.) on the job with the job ID "J01" is added to the job management information 45, and ST1 (accepting the process) is set as the current operation status (status) of the job with the job ID "J01".

The port having accepted the job with the job ID "J01" becomes occupied by the job with the job ID "J01" and enters a used status.

At Step M04, the image processing apparatus MFP transmits the acceptance permission notification to the information processing apparatus TE that transmitted the job process request.

At this point, the acceptance permission notification includes the job ID "J01" and ST1 as the current operation status (status) of the job with the job ID "J01".

At Step T03, the information processing apparatus TE receives the acceptance permission notification.

At Step T04, the job information with the job ID "J01" is transmitted to the image processing apparatus MFP.

The job information includes, for example, the user name, the job ID "J01", the image data to be processed, the image resolution (main scan/sub-scan), the number of times of retransmission and the retransmission interval in the case of fax transmission, the necessity of a result printout in the case of fax transmission, the login name and login password for user authentication, and the destination fax number.

At Step M05, the image processing apparatus MFP receives the job information.

At Step M06, the image processing apparatus MFP executes the image formation process on the image data to be processed in order to execute the requested function.

Thus, the function requested for the image data to be processed may be executed in this status, and this time point corresponds to the job acquisition completion time.

At Step M07, the current completion notification information is checked, and it is confirmed that the current completion notification information is Type B.

As the current completion notification information is Type B, the process completion notification (job normal termination notification) of the job is transmitted at the job acquisition completion time.

At Step M08, ST3 (normal termination) is set and stored as the current operation status (status).

At Step M09, the process completion notification (job normal termination notification) of the job is transmitted to the information processing apparatus TE that transmitted the job process request.

The job normal termination notification includes, for example, the user name, the job ID "J01", the status ST3 (normal termination), the number of times of retransmission and the retransmission interval in the case of fax transmission, the necessity of a result printout in the case of fax transmission, and the destination fax number.

At Step M10, the port having accepted the job with the job ID "J01" is released.

At Step M11, the process of the job with the job ID "J01" is started.

At Step T05, the information processing apparatus TE receives the job normal termination notification.

At Step T06, the display 53 of the information processing apparatus TE displays the job normal termination.

Here, it presents that the process of the job with the job ID "J01" was executed and normally terminated (e.g., the job J01: printing completed) in the image processing apparatus MFP.

The user US001 checks this display to determine that the process of the job with the job ID "J01" requested by himself/herself is complete.

In this case, even when the image processing apparatus MFP has not actually completed the process of the job with the job ID "J01", the user US001 determines that the process of the job is complete.

By the above process, the process of the requested job with the job ID "J01" is complete.

As the process of the job with the job ID "J01" requested by the user US001 is complete, the user US001 inputs the subsequent job.

At Step T07, in the same manner as at Step T01, the user US001 performs a predetermined input operation in the information processing apparatus TE to input the job with the job ID "J02" and store the image data included in the job.

At Step T08, in the same manner as at Step T02, when the user designates the image processing apparatus MFP, which is to execute the function, and performs an input operation to execute the function, the job process request is transmitted to the image processing apparatus MFP.

The job process request includes, for example, the user name, the job type, and the job ID "J02".

At Step M12, the image processing apparatus MFP receives the job process request.

Then, the same process as that described above is repeated.

Figure 17:
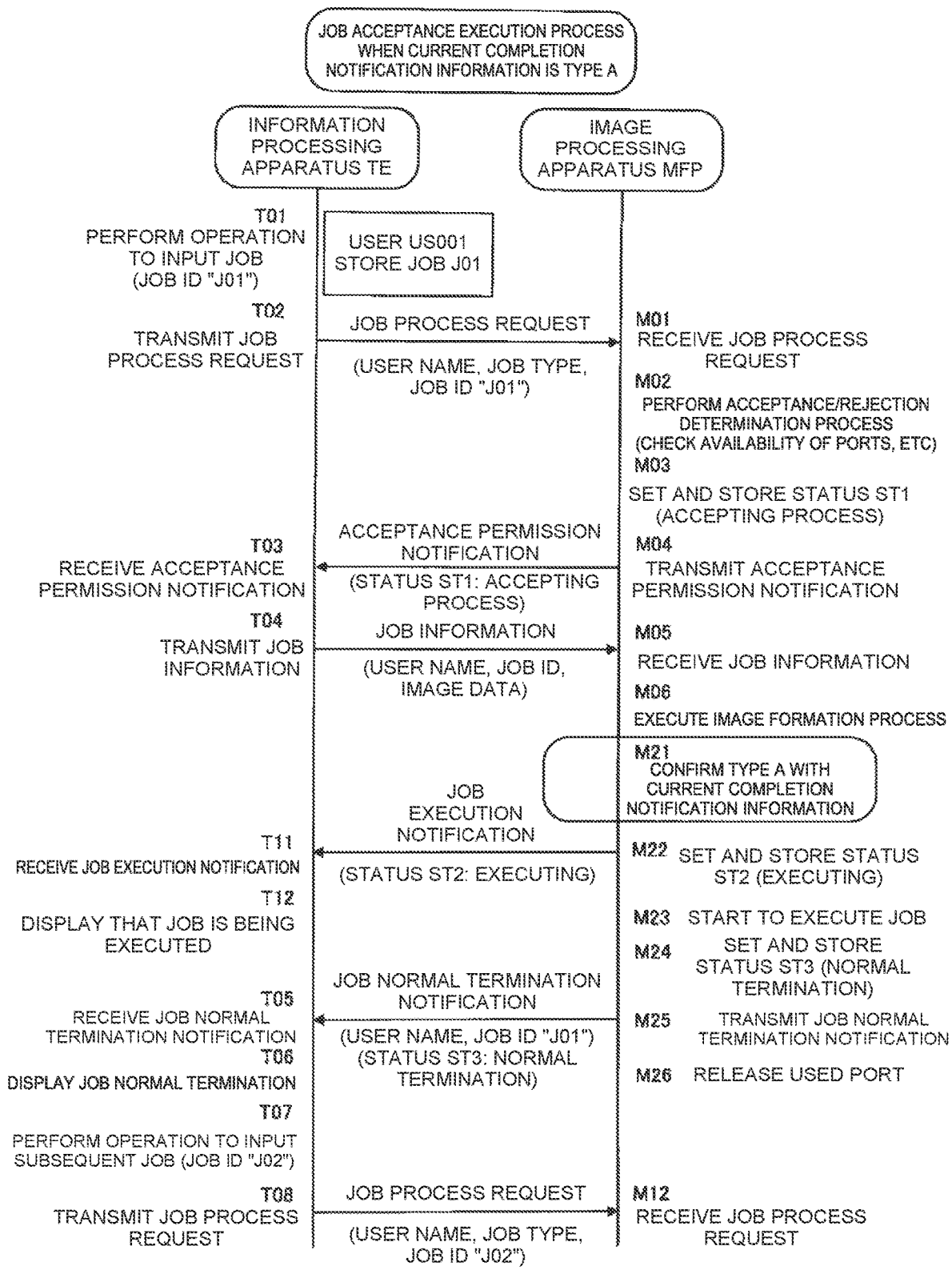
FIG. 17 illustrates a communication sequence of a job acceptance execution process performed between the image processing apparatus and the information processing apparatus when the current completion notification information is Type A according to an embodiment.

Communication Sequence of Job Acceptance Execution Process when Current Completion Notification Information is Type A FIG. 17 illustrates a communication sequence of a job acceptance execution process performed between the image processing apparatus and the information processing apparatus when the current completion notification information is Type A according to an embodiment.

The steps for performing the same process as that in the communication sequence of FIG. 16 are denoted by the same reference numerals.

Here, as the current completion notification information is Type A, the process completion notification (job normal termination notification) of the job is transmitted to the information processing apparatus TE at the job execution completion time, i.e., after the execution of the function for the job normally terminates.

In the communication sequence of FIG. 17, the same processes are performed as those from Step T01 to Step T04 of the information processing apparatus TE and from Step M01 to Step M06 of the image processing apparatus MFP in the communication sequence of FIG. 16.

That is, the processes of the job process request, acceptance permission notification, transmission of the job information, and image formation process are the same as those in FIG. 16, and therefore the description thereof is omitted.

In FIG. 17, in the image processing apparatus MFP, after Step M06, the current completion notification information is checked at Step M21.

At Step M21, it is confirmed that the current completion notification information is Type A.

When the current completion notification information is Type A, the process completion notification (job normal termination notification) of the job is transmitted at the job execution completion time, and therefore the requested function is executed for the job J01.

When the function requested for the job J01 is fax transmission, first, at Step M22, ST2 (executing fax transmission) is set and stored as the current operation status (status).

At this point, as illustrated in the figure, a job execution notification indicating that the job is being executed may be transmitted to the information processing apparatus TE. The job execution notification includes the status ST2 (executing fax transmission).

Alternatively, when the function requested for the job J01 is printing, at Step M22, ST5 (executing printing) is set and stored as the current operation status (status), and the job execution notification including the status ST5 (executing printing) may be transmitted to the information processing apparatus TE.

Then, at Step M23, in the same manner as at Step M11, the process of the job with the job ID "J01" is started.

At Step T11, the information processing apparatus TE receives the job execution notification.

At Step T12, the information processing apparatus TE having received the job execution notification may display that the job with the job ID "J01" is currently being executed.

When the process of the job with the job ID "J01" normally terminated in the image processing apparatus MFP, the process completion notification (job normal termination notification) indicating normal termination is transmitted to the information processing apparatus TE.

First, at Step M24, in the same manner as at Step M08, ST3 (normal termination) is set and stored as the current operation status (status).

At Step M25, in the same manner as at Step M09, the process completion notification (job normal termination notification) of the job is transmitted to the information processing apparatus TE that transmitted the job process request.

At Step M26, in the same manner as at Step M10, the port having accepted the job with the job ID "J01" is released.

Then, at Step T05, when the information processing apparatus TE receives the job normal termination notification, the display 53 of the information processing apparatus TE presents the job normal termination at Step T06, in the same manner as in FIG. 16.

Thus, it presents that the process of the job with the job ID "J01" was executed and normally terminated (e.g., the job J01: printing completed) in the image processing apparatus MFP.

The user US001 checks this display to determine that the process of the job requested by himself/herself is complete when the process of the job with the job ID "J01" is actually complete.

By the above process, the process of the requested job with the job ID "J01" is complete.

Then, when the process of the job with the job ID "J01" requested by the user US001 is complete and therefore the user US001 inputs the subsequent job, Steps T07 and T08 of the information processing apparatus TE are executed and Step M12 of the image processing apparatus MFP is executed as in FIG. 16 and the job process request for the subsequent job is received.

Then, the same process as that described above is repeated.

Flowchart of Completion Notification Time Switching Process

Figure 18:
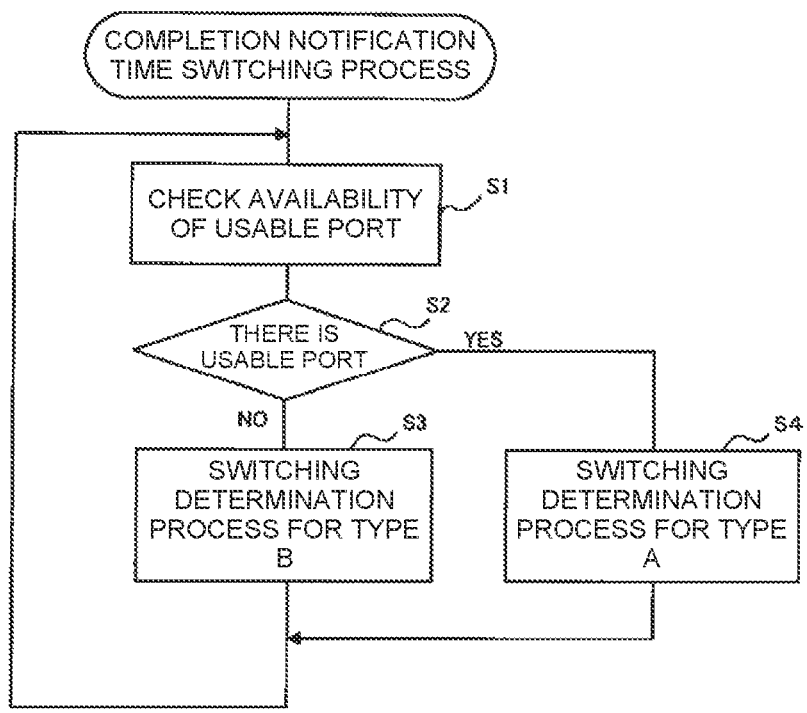
FIG. 18 is a flowchart of a completion notification time switching process in the image processing apparatus according to an embodiment of the present disclosure.

FIG. 18 is a flowchart of a completion notification time switching process in the image processing apparatus according to an embodiment.

Here, the process to determine whether the current completion notification information 44 described above is to be switched to either Type A or Type B will be described.

As described above, the current completion notification information 44 is switched to either Type A or Type B in accordance with the completion notification switching condition 43.

At Step S1 of FIG. 18, the availability of a usable port is checked. For example, when the image processing apparatus MFP includes three ports, it is checked whether one or more ports among the three ports are available ports or none of the three ports are available ports.

At Step S2, when there are one or more usable ports, the process proceeds to Step S4, and when there are no usable ports, the process proceeds to Step S3.

At Step S3, a switching determination process for Type B is performed.

When the completion notification switching condition 43 for switching to Type B is satisfied during the switching determination process for Type B, for example, the process is performed to change the current completion notification information 44 from Type A to Type B.

Figure 19:
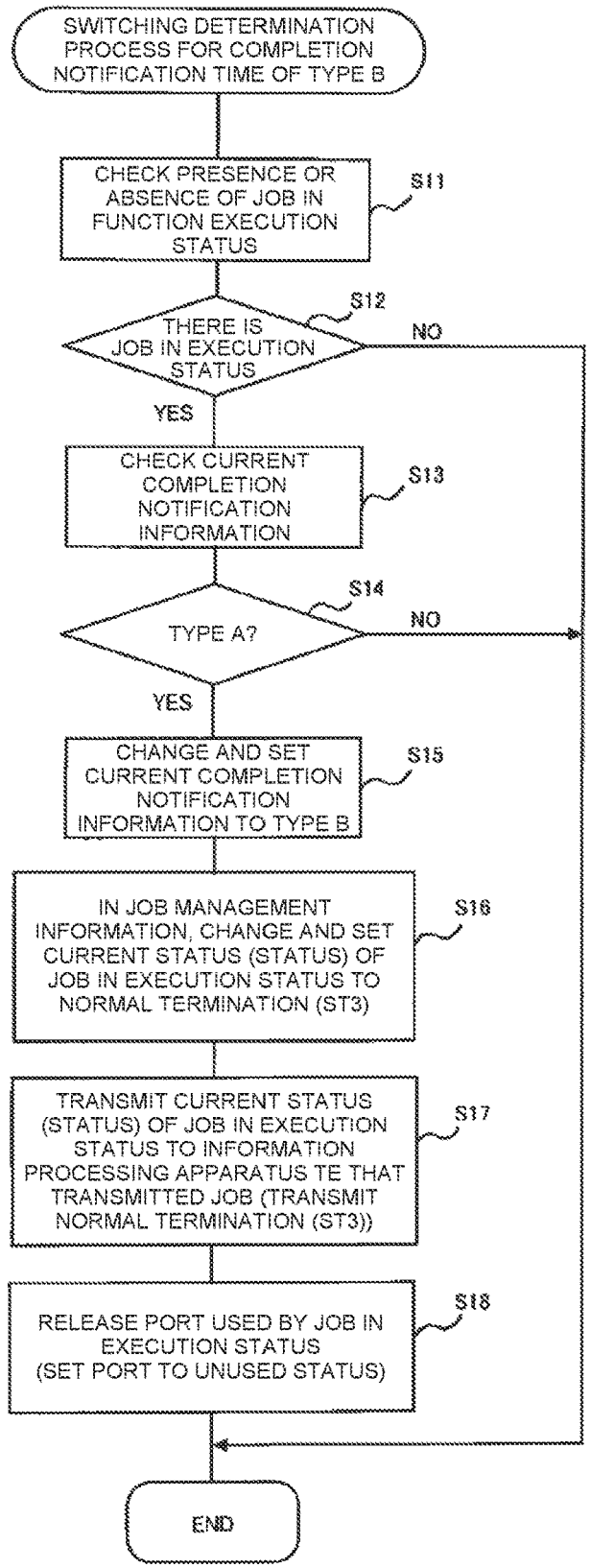
FIG. 19 is a flowchart of a determination process to switch a completion notification time to Type B during the completion notification time switching process in the image processing apparatus according to an embodiment of the present disclosure.

FIG. 19 described below illustrates the detailed flow of the switching determination process for Type B.

At Step S4, the switching determination process is performed for Type A.

When the completion notification switching condition 43 for switching to Type A is satisfied during the switching determination process for Type A, the process is performed to change the current completion notification information 44 from Type B to Type A.

Figure 20:
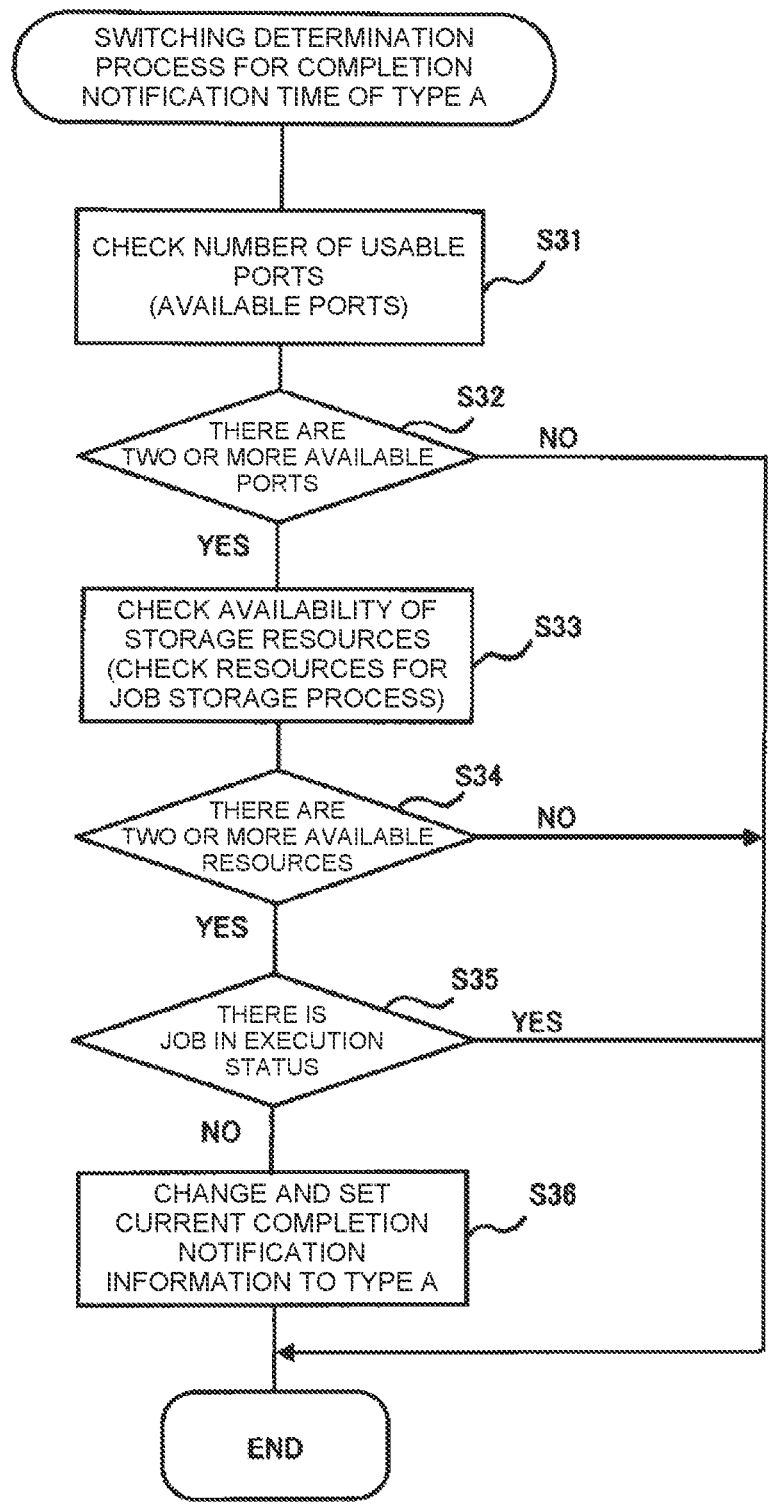
FIG. 20 is a flowchart of a determination process to switch the completion notification time to Type A during the completion notification time switching process in the image processing apparatus according to an embodiment of the present disclosure.

FIG. 20 described below illustrates the detailed flow of the switching determination process for Type A.

After Step S3 or S4, the process returns to Step S1, and the process is repeated.

Determination Process to Switch Completion Notification Time to Type B

FIG. 19 is a flowchart of a determination process to switch the completion notification time to Type B during the completion notification time switching process in the image processing apparatus according to an embodiment.

The flowchart in FIG. 19 illustrates the processing content of Step S3 described above according to an embodiment.

At Step S11 of FIG. 19, the presence or absence of a job executing the requested function is checked.

For example, it is checked whether there is a job that is currently executing a printing process or fax transmission process.

At Step S12, when there is a job currently in an execution status, the process proceeds to Step S13, and otherwise, the process terminates.

At Step S13, the current setting status of the current completion notification information 44 is checked.

At Step S14, when the current completion notification information 44 is set to Type A, the process proceeds to Step S15, and otherwise, that is, when it is set to Type B, the process terminates.

At Step S15, the current completion notification information 44 is changed and set to Type B.

Here, the fact that the current completion notification information 44 has been changed to Type B, i.e., the image processing apparatus MFP currently has the setting to transmit the process completion notification to the information processing apparatus TE at the job acquisition completion time, may be transmitted to the information processing apparatus TE.

At Step S16, in the job management information, the current status (status) of the job in an execution status is changed and set to normal termination (ST3).

At Step S17, the current status (status) of the job in an execution status is transmitted to the information processing apparatus TE that transmitted the job.

Here, normal termination (ST3) is transmitted to the information processing apparatus TE.

At Step S18, the port used by the job in an execution status is released.

Specifically, the port used by the job in an execution status is set to an unused status.

Thus, the port used by the job in an execution status enters a status so as to be used by the subsequently received job.

As above, after the current completion notification information 44 is changed to Type B, the timing for transmitting the process completion notification is the job acquisition completion time.

Determination Process to Switch Completion Notification Time to Type A

FIG. 20 is a flowchart of a determination process to switch the completion notification time to Type A during the completion notification time switching process in the image processing apparatus according to an embodiment.

The flowchart in FIG. 20 illustrates the processing content of Step S4 described above according to an embodiment.

Here, when there are not two or more usable ports (available ports), i.e., there is zero or one available port, switching is not made to Type A.

When there are not two or more usable resources (available resources), i.e., there is zero or one available resource, switching is not made to Type A.

However, the condition for not switching to Type A is not limited thereto, and for example, when there is no unavailable resource, no switching may be made to Type A.

At Step S31 of FIG. 20, the number of usable ports (available ports) is checked.

At Step S32, when there are two or more available ports, the process proceeds to Step S33, and otherwise, the process terminates.

At Step S33, the availability of storage resources is checked.

At Step S34, when there are two or more available resources, the process proceeds to Step S35, and otherwise, the process terminates.

At Step S35, when there is no job currently in an execution status, the process proceeds to Step S36, and otherwise, the process terminates.

At Step S36, the current completion notification information 44 is changed and set to Type A, and the process terminates.

At Step S36, the fact that the current completion notification information 44 has been changed to Type A, i.e., the image processing apparatus MFP currently has the setting to transmit the process completion notification to the information processing apparatus TE at the job execution completion time, may be transmitted to the information processing apparatus TE.

As above, after the current completion notification information 44 is changed to Type A, the timing for transmitting the process completion notification is the job execution completion time.

Flowchart of Job Acceptance Execution Process

Figure 21:
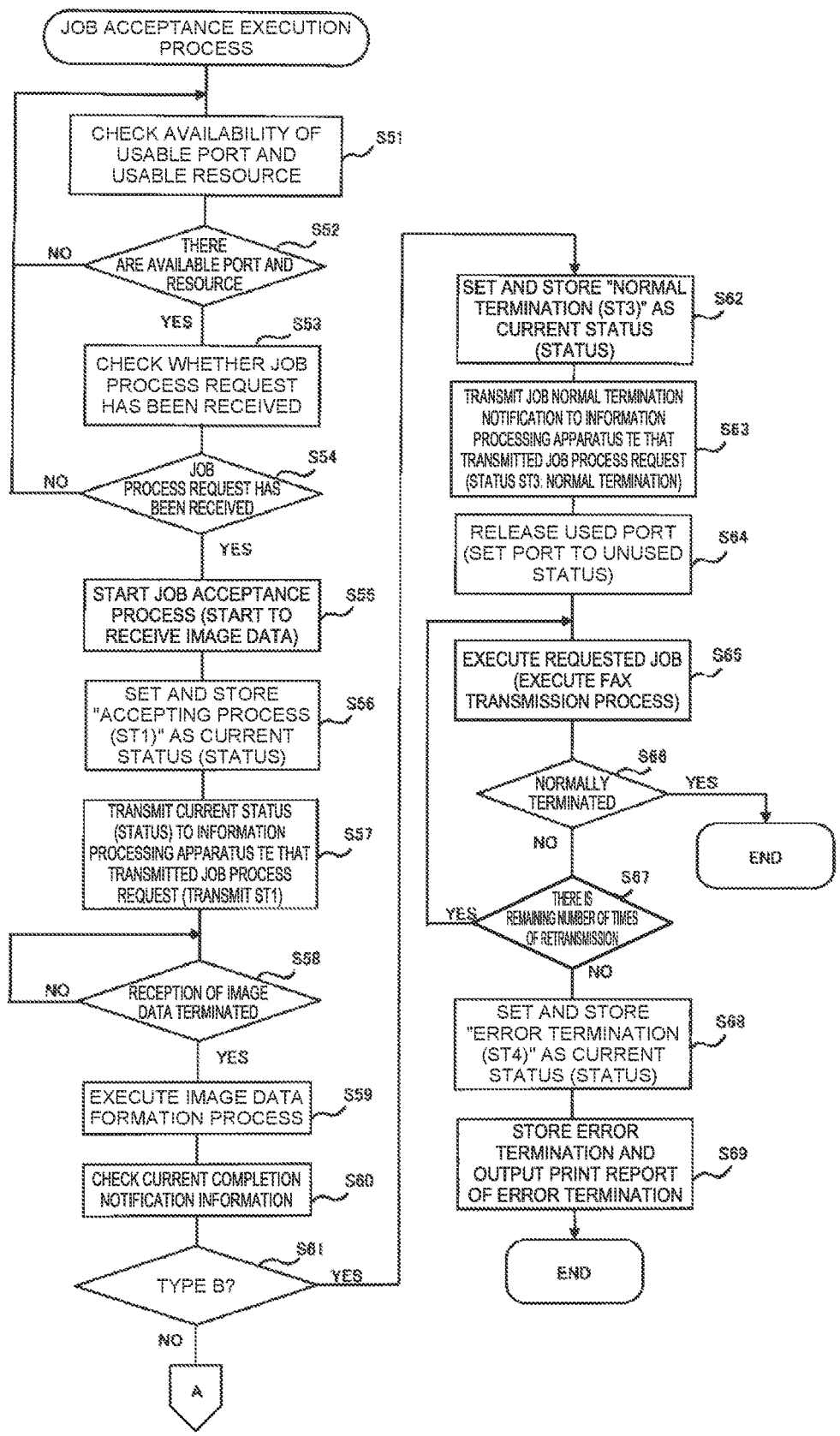
FIG. 21 is a flowchart of the job acceptance execution process in the image processing apparatus according to an embodiment of the present disclosure.
Figure 22:
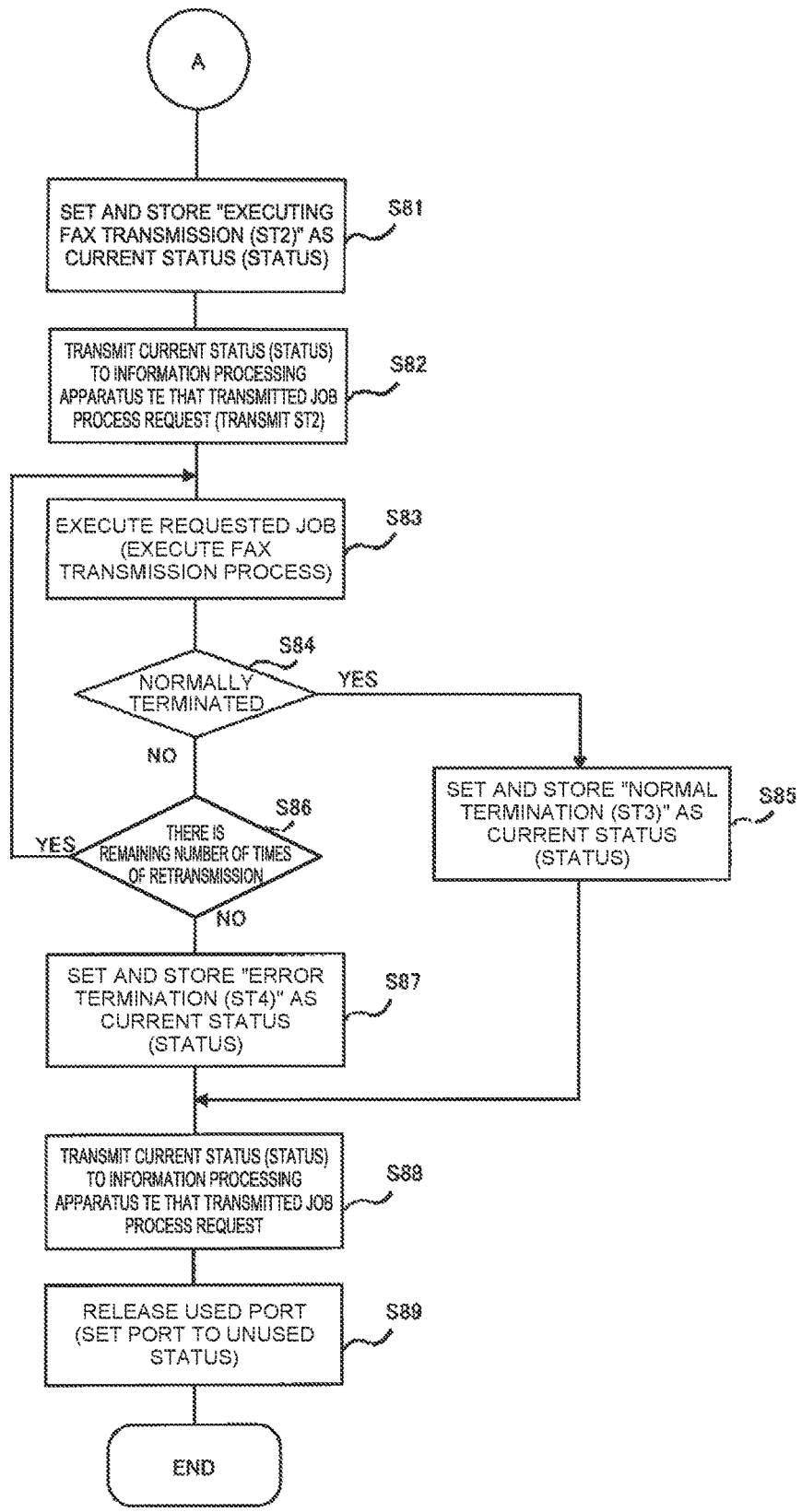
FIG. 22 is a flowchart of the job acceptance execution process in the image processing apparatus according to an embodiment of the present disclosure.

FIGS. 21 and 22 are flowcharts of a job acceptance execution process in the image processing apparatus according to an embodiment of the present disclosure.

Here, the case where the function of the requested job is a fax transmission function will be described.

Almost the same process is performed in the case of other than the fax transmission function.

At Step S51 of FIG. 21, the availability of a usable port and a usable resource is checked.

At Step S52, when there are a usable port and a usable resource, the process proceeds to Step S53, and otherwise, the process returns to Step S51.

At Step S53, it is checked whether the job process request has been received from the information processing apparatus TE.

When the job process request has been received at Step S54, the process proceeds to Step S55, and otherwise, the process returns to Step S51.

At Step S55, the available port is used to start the job acceptance process.

Here, for example, the acceptance permission notification is transmitted to the information processing apparatus TE that transmitted the job process request, and the reception of the job information including the image data to be processed starts.

At Step S56, "accepting the process (ST1)" is set and stored as the current status (status) of the accepted job in the job management information.

At Step S57, the current status "status: accepting the process (ST1)" of the accepted job is transmitted to the information processing apparatus TE that transmitted the job process request.

At Step S58, it is checked whether the reception of the image data to be processed terminated, and when the reception of the image data terminated, the process proceeds to Step S59, and otherwise, Step S58 is repeated.

At Step S59, the image formation process is executed for the received image data.

Here, for example, when the function of the requested job is the fax transmission function, the received image data is converted into data in a format that enables fax transmission.

At Step S60, the current completion notification information 44 is checked.

At Step S61, when the current completion notification information 44 is Type B, the process proceeds to Step S62, and when it is Type A, the process proceeds to Step S81 in FIG. 22.

At Step S62, "normal termination (ST3)" is set and stored as the current status (status) of the accepted job.

This is because, as the current completion notification information 44 is Type B, the process completion notification is transmitted at the job acquisition completion time.

At Step S63, the job normal termination notification is transmitted to the information processing apparatus TE that transmitted the job process request.

The job normal termination notification includes the current status "status: normal termination (ST3)" of the accepted job.

At Step S64, the used port is released.

As the job normal termination notification was transmitted, the used port is set to an unused status so as to receive the subsequent job in this status.

At Step S65, the function of the requested job is executed.

Here, fax transmission is executed for the image data to be processed.

The fax transmission function performs the process to call the destination apparatus and, when the destination apparatus responds, transmits the image data. When the destination apparatus does not respond, retransmission (redial) is executed after a predetermined period of time elapses.

When fax transmission failed to normally terminate at Step S66, the process proceeds to Step S67, and when fax transmission normally terminated, the process terminates.

At Step S67, when the number of times of retransmission for redial has not reached the previously set upper limit number (when there is any remaining number of times of retransmission), the process returns to Step S65 to execute fax transmission again.

When the number of times of retransmission has reached the previously set upper limit number (when there is no remaining number of times of retransmission), the process proceeds to Step S68.

At Step S68, "error termination (ST4)" is set and stored as the current status (status) of the accepted job.

At Step S69, as it is difficult to transmit the current status of the job to the information processing apparatus TE that transmitted the job process request, the information (error termination information) indicating error termination is stored and the error termination information is output (printed) as a print report on a predetermined print sheet.

The output print report includes, for example, information about the job that terminated as error, information about an execution result including the date and time, and the (partial) image of the job.

When the current completion notification information 44 is Type B, either in the case of normal termination or error termination of the job, the used port is already released at Step S64, and therefore the used port is set to an unused status so as to receive the subsequent job in this status.

In particular, when the current completion notification information 44 is Type B, the information processing apparatus TE is notified that the job normally terminated at the job acquisition completion time, and before the execution of the requested job starts the used port is set to an unused status; thus, it is possible to prevent a waiting status for a long time of period for acceptance of the subsequent job, and it is possible to process the subsequent job promptly.

Conversely, in the case of Type A, "executing fax transmission (ST2)" is set and stored as the current status (status) of the accepted job at Step S81 of FIG. 22.

At Step S82, the current status "status: executing fax transmission (ST2)" of the accepted job is transmitted to the information processing apparatus TE that transmitted the job process request.

At Step S83, the function (fax transmission) of the requested job is executed.

When fax transmission failed to normally terminate at Step S84, the process proceeds to Step S86, and when fax transmission normally terminated, the process proceeds to Step S85.

At Step S85, "normal termination (ST3)" is set and stored as the current status (status) of the accepted job, and the process proceeds to Step S88.

At Step S86, when the number of times of retransmission for redial has not reached the previously set upper limit number (when there is any remaining number of times of retransmission), the process returns to Step S83 to execute fax transmission again.

When the number of times of retransmission has reached the previously set upper limit number (when there is no remaining number of times of retransmission), the process proceeds to Step S87.

At Step S87, "error termination (ST4)" is set and stored as the current status (status) of the accepted job, and the process proceeds to Step S88.

At Step S88, the current status (status) of the accepted job is transmitted to the information processing apparatus TE that transmitted the job process request.

When "normal termination (ST3)" is set as the current status (status), the normal termination notification including the current status "status: normal termination (ST3)" is transmitted.

Conversely, when "error termination (ST4)" is set as the current status (status), the current status "status: error termination (ST4)" is transmitted.

At Step S89, in the same manner as at Step S64, the used port is released.

Specifically, in both cases of normal termination and error termination of the job, the used port is set to an unused status at this point so as to accept the subsequent job in this status.

OTHER EMBODIMENTS

First Embodiment: Condition for Switching Current Completion Notification Information In the above embodiment, the current completion notification information is automatically set to either Type A or Type B based on the completion notification switching condition that is previously set and stored.

However, the completion notification switching conditions are not limited to those illustrated in FIG. 4.

For example, the availability of resources may be determined based on, not whether available or unavailable, but based on whether the number of available resources is less than a predetermined number.

Instead of switching by determining the used status of the resource, Type A may be switched to Type B based on the job type, e.g., for only a fax transmission job.

Furthermore, Type A may be switched to Type B for only a previously set fax transmission destination.

Second Embodiment: Manual Setting of Current Completion Notification Information In the above embodiment, for the setting of the current completion notification information, the current completion notification information 44 is automatically switched in the image processing apparatus MFP, but is not limited thereto.

The user may perform a predetermined input operation in the information processing apparatus TE, and thus the information processing apparatus TE may transmit the request for switching the current completion notification information to the image processing apparatus MFP, and the current completion notification information of the image processing apparatus MFP may be switched to either Type A or Type B.

That is, the current completion notification information of the image processing apparatus MFP may be set and stored for each of the information processing apparatuses TE.

For example, after the switching request for switching the current completion notification information to Type B is received from an information processing apparatus TE1, the process completion notification may always be transmitted to the information processing apparatus TE1 at the job acquisition completion time.

After the switching request for switching the current completion notification information to Type A is received from another information processing apparatus TE2, the process completion notification may always be transmitted to the information processing apparatus TE2 at the job execution completion time.

Third Embodiment: Setting Change for Current Completion Notification Information According to the above embodiment, the current completion notification information is switched to either Type A or Type B based on the completion notification switching condition regardless of the type of job requested by the information processing apparatus TE, but is not limited thereto.

For each function executed for the job, the current completion notification information may be switched to Type A or Type B.

For example, when the function executed for the job is "fax transmission", it may take a long time to actually complete the process of fax transmission in consideration of the possibility of retransmission; therefore, when the job type included in the received job process request is "fax transmission", the current completion notification information is switched to Type B, and the process completion notification may be transmitted to the information processing apparatus TE at the job acquisition completion time.

When the function executed for the job is "printing function", it may take a short time to terminate printing; therefore, when the job type included in the received job process request is "printing", the current completion notification information is switched to Type A, and the process completion notification may be transmitted to the information processing apparatus TE at the job execution completion time.

Alternatively, when the function executed for the job is "printing function", the current completion notification information may be switched to either Type A or Type B in consideration of the number of print copies.

For example, when the number of print copies in the requested print job is 1, the current completion notification information may be set to Type A, and when the number of print copies in the requested print job is 100, the current completion notification information may be set to Type B.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image processing apparatus comprising:
a job acquirer that acquires a job transmitted from an information processing apparatus;
a function executor that executes a function requested for the acquired job; and
a completion notification selector that selects a time for transmitting, to the information processing apparatus, a process completion notification indicating normal termination of execution of the function after the function is executed, wherein
the completion notification selector selects, depending on whether the job acquirer acquires a new job, either a job execution completion time that is a time when the execution of the function normally terminates or a job acquisition completion time that is a time before the execution of the function starts, as the time for transmitting the process completion notification to the information processing apparatus, and
in a status where a function is currently being executed and no new job is acquirable, the completion notification selector selects the job acquisition completion time as the time for transmitting the process completion notification to the information processing apparatus.

2. The image processing apparatus according to claim 1, wherein, in a status where the job acquisition completion time is selected as the time for transmitting the process completion notification to the information processing apparatus, after the process completion notification for the job acquired by the job acquirer is transmitted to the information processing apparatus, the function executor starts to execute the function requested for the acquired job.

3. The image processing apparatus according to claim 1, further comprising one or more ports that acquire the job transmitted from the information processing apparatus, wherein
a status where no new job is acquirable is a status where no port is capable of acquiring a job.

4. The image processing apparatus according to claim 1, wherein, in a status where no function is currently being executed and a new job is acquirable, the completion notification selector selects the job execution completion time as the time for transmitting the process completion notification to the information processing apparatus.

5. The image processing apparatus according to claim 4, wherein, in a status where the job execution completion time is selected as the time for transmitting the process completion notification to the information processing apparatus, after the function requested for the acquired job is executed by the function executor and the function normally terminates, the process completion notification for the job, for which the function normally terminated, is transmitted to the information processing apparatus.

6. The image processing apparatus according to claim 4, further comprising:
one or more ports that acquire the job transmitted from the information processing apparatus; and
one or more storage resources that are storage areas used to execute the function required for the acquired job, wherein
the status where the new job is acquirable is a status where the one or more ports are capable of acquiring the job and the one or more storage resources are available to execute the function required for the acquired job.

7. The image processing apparatus according to claim 2, wherein the job acquirer is capable of acquiring at least one new job in a status after the process completion notification for the acquired job is transmitted to the information processing apparatus.

8. An image processing apparatus comprising:
a job acquirer that acquires a job transmitted from an information processing apparatus;
a function executor that executes a function requested for the acquired job; and
a completion notification selector that selects a time for transmitting, to the information processing apparatus, a process completion notification indicating normal termination of execution of the function after the function is executed, wherein
the completion notification selector selects, depending on whether the job acquirer acquires a new job, either a job execution completion time that is a time when the execution of the function normally terminates or a job acquisition completion time that is a time before the execution of the function starts, as the time for transmitting the process completion notification to the information processing apparatus, and
when the time for transmitting the process completion notification to the information processing apparatus is changed from the job execution completion time to the job acquisition completion time and when the time for transmitting the process completion notification to the information processing apparatus is changed from the job acquisition completion time to the job execution completion time, the change in the time for transmitting the process completion notification to the information processing apparatus is transmitted to the information processing apparatus.

9. The image processing apparatus according to claim 1, further comprising an operation status notifier that transmits the process completion notification of a job requesting the function currently being executed to the information processing apparatus.

10. An operation status notification method for an image processing apparatus, comprising:
acquiring a job transmitted from an information processing apparatus;
executing a function requested for the acquired job;
selecting a time for transmitting, to the information processing apparatus, a process completion notification indicating normal termination of execution of the function after the function is executed;
transmitting the process completion notification to the information processing apparatus, wherein selecting the time further comprises:
selecting, depending on whether a new job is acquired, either a job execution completion time that is a time when the execution of the function normally terminates or a job acquisition completion time that is a time before the execution of the function starts, as the time for transmitting the process completion notification to the information processing apparatus,
when the image processing apparatus is in a status where a function is currently being executed and no new job is acquirable, selecting the job acquisition completion time as the time for transmitting the process completion notification to the information processing apparatus; and
after acquiring the job;
transmitting the process completion notification at the job acquisition completion time before the execution of the function requested for the acquired job starts, and
executing the function after the process completion notification for the acquired job is transmitted to the information processing apparatus.

* * * * *